United States Patent
Jackson

(10) Patent No.: US 11,318,876 B2
(45) Date of Patent: May 3, 2022

(54) CARGO RETAINER

(71) Applicant: Home Depot Product Authority, LLC, Atlanta, GA (US)

(72) Inventor: Nicholas Jackson, Marietta, GA (US)

(73) Assignee: Home Depot Product Authority, LLC, Atlanta, GA (US)

(*) Notice: Subject to any disclaimer, the term of this patent is extended or adjusted under 35 U.S.C. 154(b) by 231 days.

(21) Appl. No.: 16/829,279

(22) Filed: Mar. 25, 2020

(65) Prior Publication Data
US 2021/0300231 A1    Sep. 30, 2021

(51) Int. Cl.
| | |
|---|---|
| B60P 7/08 | (2006.01) |
| F16B 1/00 | (2006.01) |
| F16B 2/16 | (2006.01) |
| F16B 2/10 | (2006.01) |
| F16B 2/06 | (2006.01) |

(52) U.S. Cl.
CPC .............. B60P 7/0876 (2013.01); F16B 1/00 (2013.01); F16B 2/065 (2013.01); F16B 2/10 (2013.01); F16B 2/16 (2013.01)

(58) Field of Classification Search
CPC ........................................................ B60P 7/08
USPC .............................. 410/117, 118, 96, 97, 100
See application file for complete search history.

(56) References Cited

U.S. PATENT DOCUMENTS

| | | |
|---|---|---|
| 5,011,349 A | 4/1991 | McAndrews |
| 5,351,827 A | 10/1994 | Baka |
| 5,452,973 A | 9/1995 | Arvin |
| 5,915,899 A | 6/1999 | Dennis |
| 6,164,883 A | 12/2000 | Wilcox |
| 6,626,620 B1 | 9/2003 | Veal |
| 6,702,533 B1 | 3/2004 | Williams et al. |
| 6,863,482 B2 | 3/2005 | Lockhart et al. |
| 7,217,074 B1 | 5/2007 | Huber |
| 7,837,421 B1 | 11/2010 | Rowe |
| 8,322,924 B2 | 12/2012 | Noble et al. |
| 8,740,525 B2 | 6/2014 | Coury et al. |
| 8,992,146 B2 | 3/2015 | Dibner |
| 9,399,424 B2 | 7/2016 | St. Jean |
| 9,566,893 B2 | 2/2017 | Blohm |
| 9,873,367 B2* | 1/2018 | Dexter .................. B60P 7/0876 |
| 10,076,991 B2* | 9/2018 | Buckhalt ................... B60P 7/08 |

(Continued)

FOREIGN PATENT DOCUMENTS

| | | |
|---|---|---|
| CA | 2439649 A | 3/2004 |
| CA | 2765862 A | 7/2013 |

(Continued)

Primary Examiner — D Glenn Dayoan
Assistant Examiner — Sunsurraye Westbrook
(74) Attorney, Agent, or Firm — Greenberg Traurig, LLP

(57) ABSTRACT

A cargo retainer for use with a vehicle includes a mat having a top side, a bottom side, a leading portion, a trailing portion, and an aperture for securing the trailing portion to the vehicle via a fastener. The cargo retainer includes a retention anchor configured to attach to the vehicle. The retention anchor has a top portion and a cleat portion such that the top portion is coupled with the leading portion of the mat. The cleat portion of the retention anchor extends away from the bottom side of the mat and is adapted to be inserted into and retained by a gap formed between a cargo area of the vehicle and either a tailgate of the vehicle or a bumper of the vehicle.

64 Claims, 18 Drawing Sheets

(56) References Cited

U.S. PATENT DOCUMENTS 10,131,384 B2 * 11/2018 Raines .................. B60P 7/0876
10,710,647 B2 * 7/2020 Wolf-Monheim ... B62D 33/037

FOREIGN PATENT DOCUMENTS

MX     PA03008118 A    11/2004
MX     2017005319 A    8/2018

* cited by examiner

CARGO RETAINER

BACKGROUND

Many individuals, including construction workers, contractors, farmers, other manual laborers, and individuals in their personal capacity, regularly use pickup trucks for transporting goods, tools, and raw materials, such as lumber, sheet good or the like, to and from various sites. Oftentimes, such materials are oversized in length and/or width making it difficult to safely and properly secure the materials in a truck bed during transit. In certain situations, such materials may extend above or outside the confines of the truck bed and tailgate making it difficult to drive safely, including properly using sideview and rearview mirrors. It is also difficult to load and unload oversized materials thus decreasing the efficiencies of using a pickup truck and increasing the likelihood of injury to individuals. As a result, the materials may slip, rub or fall, resulting in damage to the materials or truck bed, or risking the safety of the roadway and other drivers. Instead, many individuals would prefer to lay certain oversized materials, like lumber, flat across the truck bed and tailgate, but an adequate solution for securing the load did not previously exist.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One aspect of the present invention includes a cargo retainer for use with a vehicle that includes a mat having a top side, a bottom side, a leading portion, a trailing portion and an aperture for securing the trailing portion to the vehicle via a fastener. The cargo retainer further includes a retention anchor configured to attach to the vehicle. The retention anchor includes a top portion and a cleat portion, wherein the top portion is coupled with the leading portion of the mat and the cleat portion extends away from the bottom side of the mat.

A second aspect of the present invention includes a cargo retainer for use with a vehicle that includes a mat having a top side, a bottom side, a leading portion, and a trailing portion and an aperture for securing the trailing portion to the vehicle via a fastener. The cargo retainer further includes an interchangeable retention anchor configured to attach to the vehicle. The interchangeable retention anchor includes a top portion and a cleat portion such that the top portion is removably coupled with a retention plate. The retention plate is coupled between the leading portion of the mat, and the cleat portion extends away from the bottom side of the mat.

A third aspect of the disclosure includes a cargo retainer for use with a vehicle that includes a mat having a top side, a bottom side, a leading portion, a trailing portion, edge portions extending between the leading portion and the trailing portion, and a plurality of apertures disposed at a plurality of locations on the edge portions. The apertures can be used to selectively secure the mat to the vehicle via a fastener. The cargo retainer further includes a plurality of interchangeable retention anchors configured to attach to the vehicle. Each interchangeable retention anchor has a top portion and a cleat portion such that the top portion is removably coupled with a retention plate and selectively positionable at a plurality of locations on the retention plate. The retention plate is coupled between the leading portion of the mat. Each cleat portion extends away from the bottom side of the mat such that the cleat portion is adapted to be inserted into and retained by a gap formed between a cargo area of the vehicle and either a tailgate of the vehicle or a bumper of the vehicle.

BRIEF DESCRIPTION OF THE DRAWINGS

The various features, advantages and other uses of the present apparatus will become more apparent by referring to the following detailed description and drawings in which.

DETAILED DESCRIPTION

Reference will now be made in detail to various embodiments of the invention, examples of which are illustrated in the accompanying drawings. While the invention will be described in conjunction with the certain embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Generally speaking, various embodiments provide an apparatus for use with a vehicle to retain cargo, like lumber or sheet material, that may be oversized for a given cargo area of a vehicle, e.g. a truck bed. Because oversized cargo may extend beyond the confines of the vehicle's cargo area, such cargo is difficult to secure and safely transport. Various embodiments include a mat coupled to the vehicle via a retention anchor such that cargo may be loaded into the vehicle's cargo area and extend over the mat. The mat may then be folded over the ends and/or sides of the oversized cargo to secure the cargo during transit. The mat can be fastened to the vehicle in myriad ways, including by bungee cords or the like selectively secured to apertures in the mat.

The cargo retainer according to various embodiments secures to the vehicle by engaging a retention anchor with an identifiable structure of the body of the vehicle, such as a gap between the truck bed and tailgate of a pickup truck. The retention anchor may be inserted into a gap in the vehicle body or latch onto an edge of the vehicle body, like a bumper. The retention anchor has a cleat portion that can be inserted into and fill gaps of various widths. Because various vehicle models may differ in size and shape, gap size and location may differ vehicle to vehicle. Thus, embodiments may include one or more retention anchors that can be interchangeable and adaptable for use with numerous vehicle types. It should be appreciated that each interchangeable retention anchor may be removably coupled with a retention plate and selectively positionable at a plurality of locations on the retention plate. Each retention anchor may be variable in width, or have attachable accessories that are variable in width, that can fill a gap in a vehicle body thereby fixing the cargo retainer to the vehicle and reducing rattling of the retention anchor relative to the vehicle body.

Figure 1A:
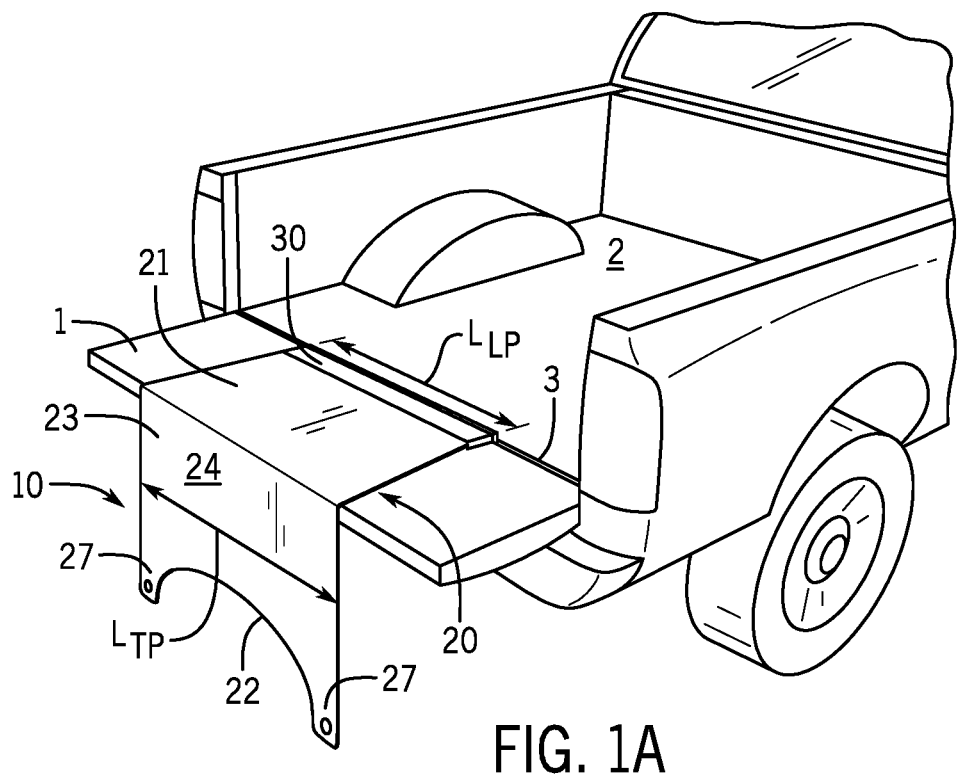
FIG. 1A is a perspective view of a cargo retainer, in accordance with various embodiments of the present invention.
Figure 1B:
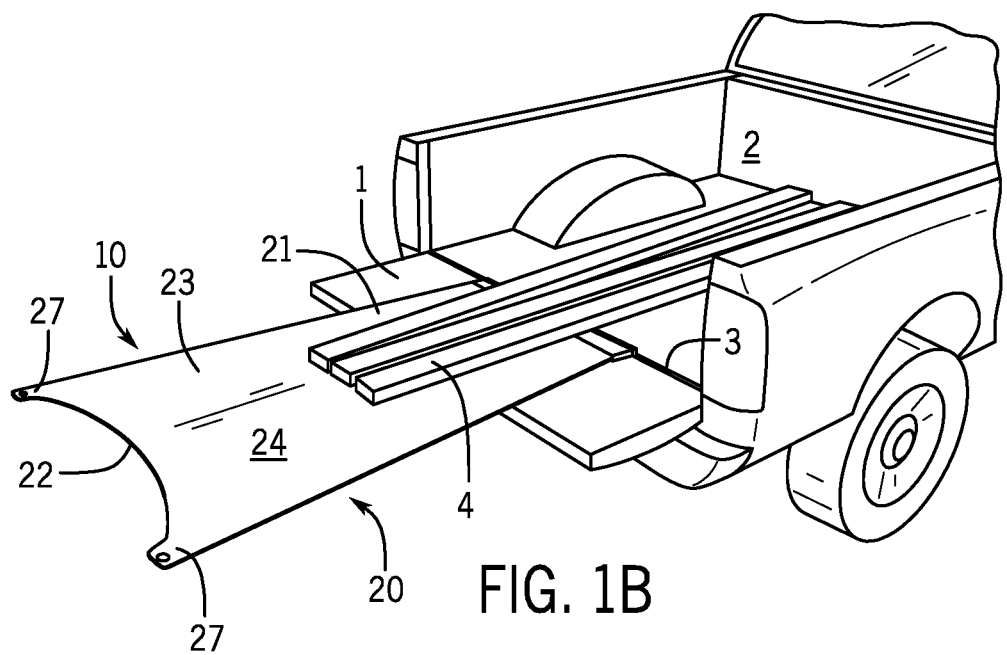
FIG. 1B is a perspective view of a cargo retainer cargo loaded on the cargo retainer and the trailing portion of the cargo retainer unsecured to a vehicle, in accordance with various embodiments of the present invention.

FIGS. 1A and 1B are perspective views of a cargo retainer 10, shown both without and with cargo, respectively, in accordance with various embodiments of the present invention. As shown, the cargo retainer 10 includes a mat 20 and a retention anchor 30. When loading cargo into a vehicle, such as a pickup truck shown in FIG. 1A, a user may insert the retention anchor 30 in a gap 3 formed between a cargo area of the vehicle 2 and a portion of the vehicle body 1, for instance, either a tailgate of the vehicle or a bumper of the vehicle. Cargo 4, such as lumber or sheet goods, may be laid across the mat 20, as shown in FIG. 1B, such that the mat 20 is secured between the cargo 4 and a portion of the vehicle body 1 by the weight of the cargo.

The mat 20 includes a top side 24, a bottom side 25 (partially shown in FIG. 2A, discussed below), a leading portion 21, and a trailing portion 22. The mat 20 also has edge portions 23 extending between the leading portion and the trailing portion.

The bottom side 25 rests against the tailgate, for example. The top side 24 faces opposite the bottom side 25. The cargo 4 generally lays on the top side 24, as shown in FIG. 1B, securing the leading portion 21 between the tailgate 1 and the cargo, for example. Once the cargo 4 is loaded into the vehicle, like a pickup truck, the trailing portion 22 of mat 20 may be folded over the cargo 4 toward the leading portion 21 and secured to the truck bed, as discussed in more detail below.

The shape of the mat 20 may vary. For example, the mat 20 may be approximately rectangular. In some embodiments, it may be desirable for the leading portion 21 to have a longer length, $L_{LP}$, than the trailing portion length, $L_{TP}$, or vice versa. In those circumstances, the mat 20 may be approximately trapezoidal such that the mat 20 tapers either from the leading portion 21 to the trailing portion 22, or vice versa.

In certain embodiments, the edge portions 23 connecting the leading portion 21 and trailing portion 22 may be approximately straight, as shown in FIG. 1A. The edge portions 23 may also include cutouts, flaps, ridges, curvature, or the like. The present disclosure contemplates the mat 20 having any suitable shape for securing cargo 4.

Similarly, the trailing portion 22 may be approximately straight. However, the cut of the trailing portion 22 can vary. For example, as shown in FIGS. 1A and 1B, the trailing portion 22 may include extended corners 27. In some embodiments, such as shown in FIG. 1B, the trailing portion 22 may be curved between extended corners 27. It is contemplated that the trailing portion 22 may have any suitable length and contour.

To suitably secure a leading portion 21 to a particular part of a vehicle 1, such as a tailgate, a bumper, or a trunk, the leading portion 21 may have curvature substantially corresponding to that part of the vehicle such that the retention anchor 30, which is attached to the leading portion 21, can suitably couple to the vehicle. In certain embodiments, the leading portion 21 may be approximately straight. For example, because the gap 3 between a tailgate 1 and a truck bed 2 is typically straight, a leading portion 21 that is generally straight would be desirable for coupling to a truck bed 2 and tailgate 1, as shown in FIGS. 1A-B.

The mat 20 can be constructed of any suitable flexible material for securing and hauling cargo. In various embodiments, the mat 20 can be made of a suitable material, such as rubber or other polymeric material, carbon fiber, or wool. When desired or required, the mat 20 can be water resistant. In some embodiments, the mat 20 may be textured on the top side 24, the bottom side 25, or both, to provide additional frictional surfaces, such as ribbing, treads, or raised diamonds, to prevent movement relative to the cargo 4 or tailgate 1.

Figure 2A:
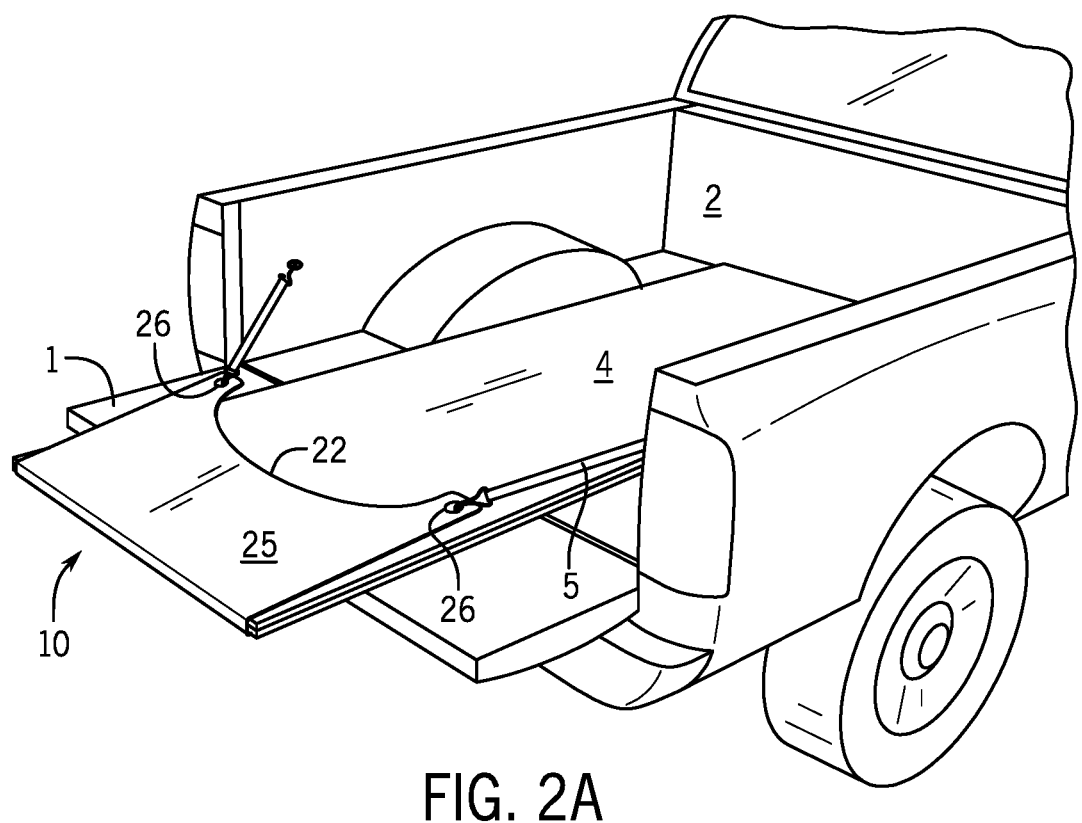
FIG. 2A is a perspective view of a cargo retainer with cargo loaded on the cargo retainer and the trailing portion of the cargo retainer secured to a vehicle in a first manner, in accordance with various embodiments of the present invention.
Figure 2B:
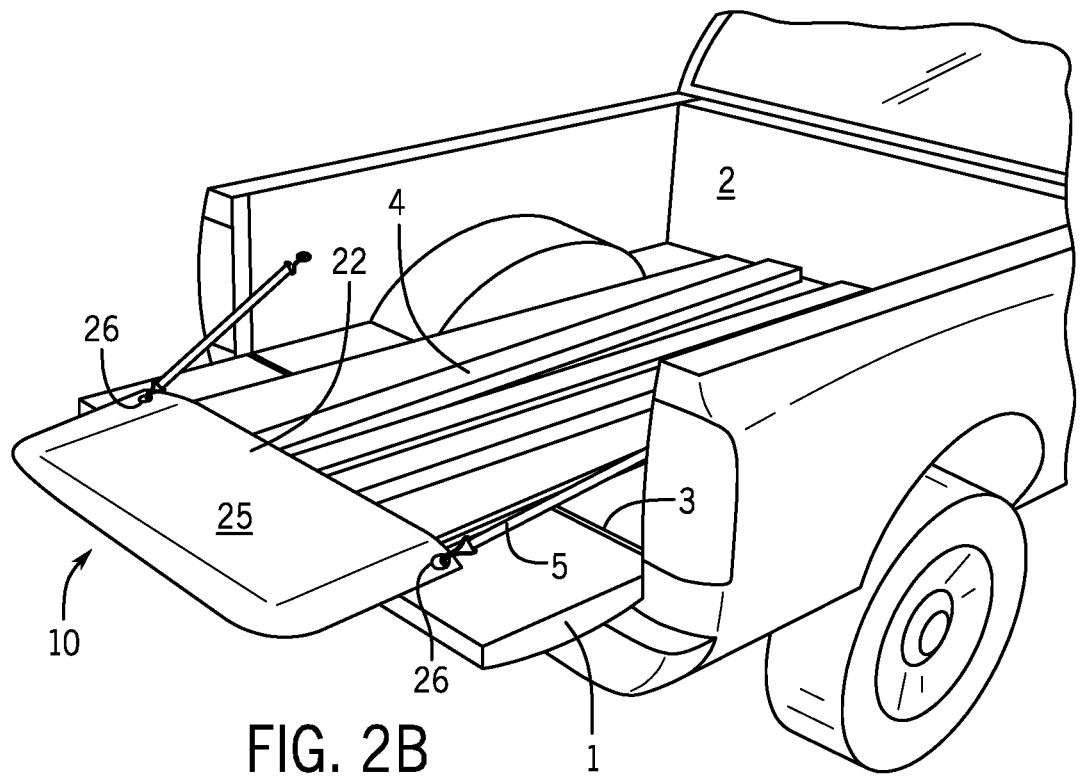
FIG. 2B is a perspective view of a cargo retainer with cargo loaded on the cargo retainer and the trailing portion of the cargo retainer secured to a vehicle in a second manner, in accordance with various embodiments of the present invention.
Figure 2C:
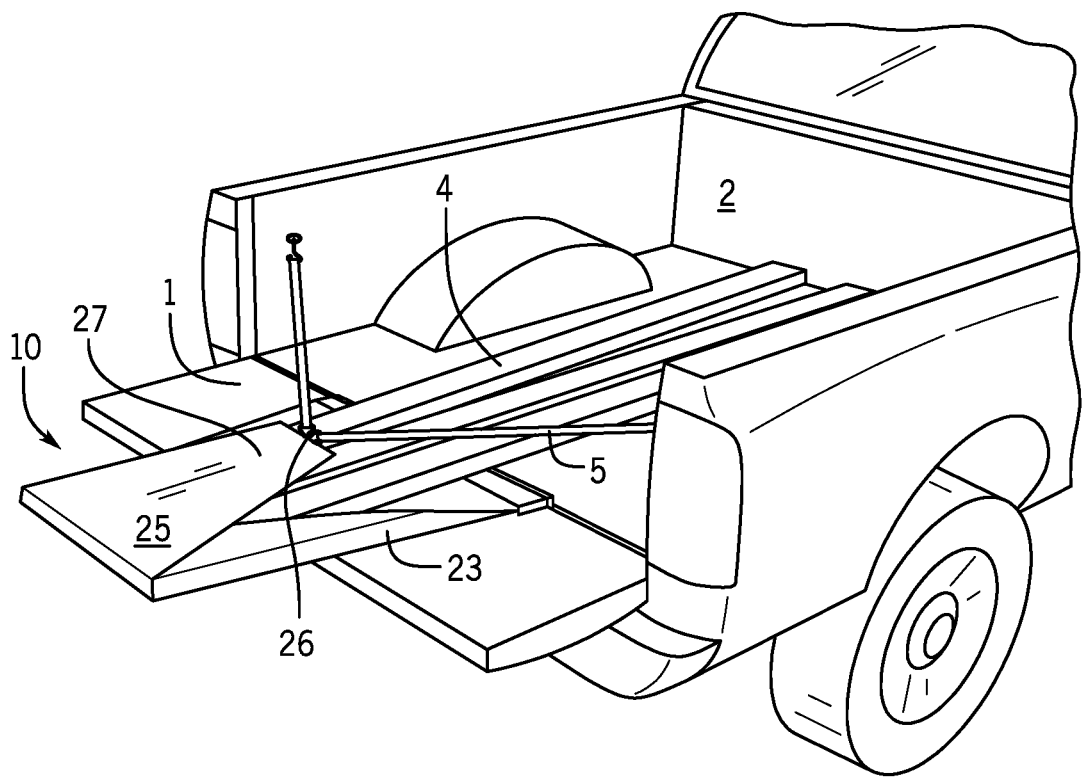
FIG. 2C is a perspective view of a cargo retainer with cargo loaded on the cargo retainer and the trailing portion of the cargo retainer secured to a vehicle in a third manner, in accordance with various embodiments of the present invention.
Figure 3:
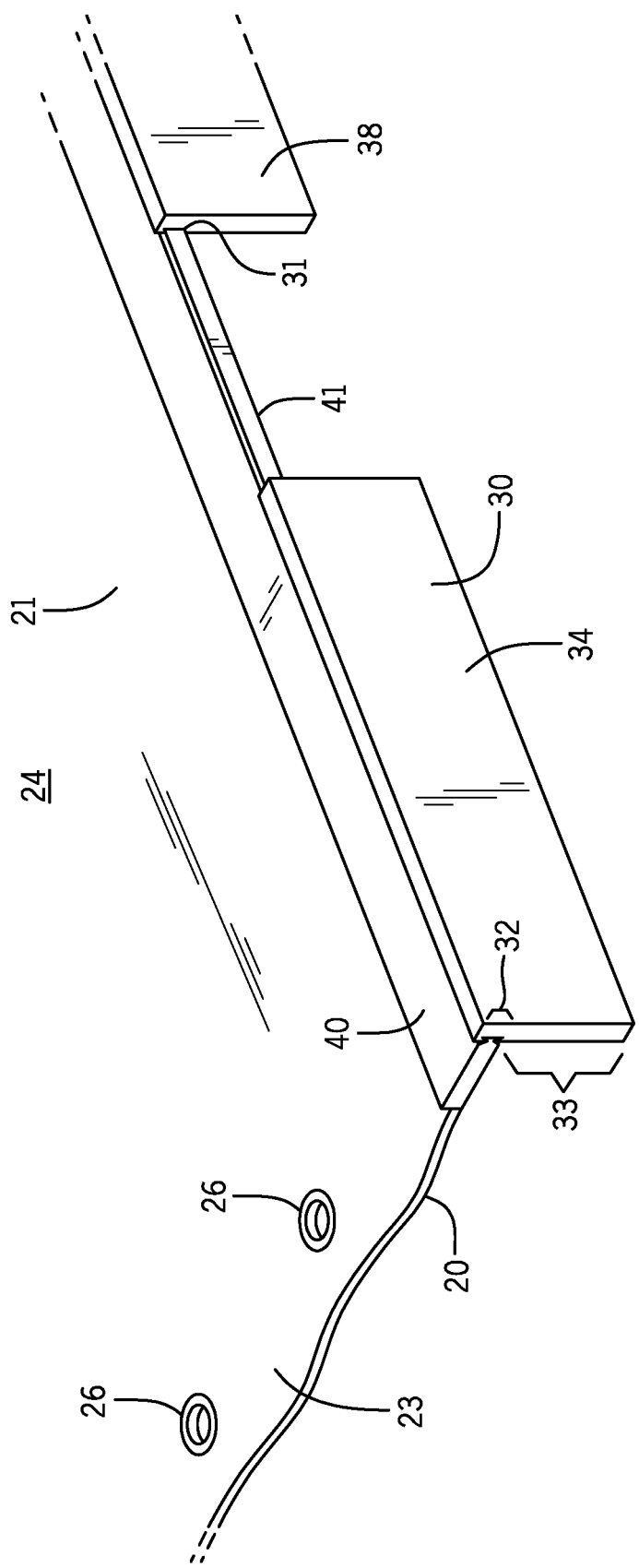
FIG. 3 is a perspective view of a cargo retainer having a removable retention anchor, in accordance with various embodiments of the present invention.

FIGS. 2A, 2B and 2C show three different configurations of the mat 20 for securing cargo 4, in accordance with various embodiments of the present invention. As shown, when the trailing portion 22 of the mat 20 is folded back over the cargo 4 toward the leading portion 21 and secured to the truck bed, the mat 20 forms a pocket, pouch, or the like, around the cargo 4, as will be discussed more fully below. In some embodiments, the mat 20 may include one or more apertures 26, such as eyelets, grommets, rings, loops, or the like, disposed at various locations along the edge portions 23. These apertures 26 help secure the trailing portion 22 to the vehicle via one or more fasteners 5, as well as allow for numerous folding configurations. Example fasteners 5 may include tiedowns, straps, ropes, bungee cords, or the like. The apertures 26 may be placed near the trailing portion 22 of the mat 20, for example. However, there may be multiple apertures 26 around the perimeter of the mat 20, as shown in FIG. 3, or spread uniformly over mat 20. In certain embodiments, it may be desirable for the apertures 26 to be asymmetrically spaced across mat 20 such that cargo 4 may be secured in different manners depending on the size and shape of the cargo 4. In some instances, depending on the make and model of the vehicle, for example, the mat 20 may need to be secured at various locations to suitably retain the cargo 4 and thus having numerous apertures 26 may be desirable. Accordingly, the cargo retainer 10 described herein may be versatile, being attachable from multiple apertures 26 and to any suitable part of a vehicle.

For example, with reference to FIG. 2A, when cargo 4 is wider than the mat 20, like some larger sheet good, a simple fold of mat 20 may be sufficient to retain the cargo 4. The mat 20 may be secured to the truck bed via fasteners 5, such as straps or the like, connected to apertures 26. The fasteners 5 pull the trailing portion 22 over the cargo and toward the leading portion 21 such that top side 24 contacts the cargo 4 and presses it into the cargo area 2 of the vehicle—in this case, a truck bed.

In another embodiment, as shown in FIG. 2B, the cargo retainer 10 may be configured to form a pocket from mat 20 so as to prevent the side-to-side movement of cargo. The top side 24 may be folded over the cargo and secured to the truck bed by fasteners 5, such as bungee cords or the like, connected to apertures 26. The trailing portion 22 envelopes the ends of the cargo distal to the cargo area of the vehicle, including substantially enclosing a portion of the sides of the cargo, thereby forming a pocket or enclosure. Moreover, in some embodiments in which there are multiple apertures 26 spaced along the edge portions 23, additional fasteners 5, such as zip ties, may be used to fasten the portion of the mat 20 above the cargo 4 to the portion of the mat under the cargo 4, thereby cinching the sides to create a closed or semi-closed pouch.

In another embodiment, as shown in FIG. 2C, it may be desirable to form a crossover pocket such that the extended corners 27 of the trailing portion 22 fold toward the center of mat 20. The fasteners 5 attach to the apertures 26 opposite the fastening location on the vehicle thereby crossing over one another and folding the extended corners 27 over the cargo and toward the center of mat 20. In some instances, when apertures 26 are disposed on the edge portions 23 of the mat 20, fasteners 5 may attach to such apertures 26 opposite the fastening location to pull the edge portions 23 over the side of cargo.

It should be appreciated that the cargo retainer 10 may be folded in numerous manners to suitably secure the cargo, depending on the sizes and shapes of the cargo, the vehicle, and the cargo retainer 10. How a user folds the cargo retainer 10 may also depend on the location and number of the apertures 26.

In some embodiments, the cargo retainer 10 may also include a retention plate 40 coupled with the leading portion 21 of the mat 20. The retention plate 40 may be an elongated member, like a beam or rod, extending the length of the leading portion, $L_{LP}$. In other embodiments, there may be a plurality of retention plates 40 disposed on the leading portion 21 of the mat 20. The retention plate 40 may only partially extend across the leading portion 21, in some embodiments.

The retention plate 40 may couple, directly or indirectly, with the leading portion 21 by any suitable coupling means. For instance, the retention plate 40 may be fixed to leading portion 21 by any suitable manufacturing process like crimping, stamping, clamping, or pressing. In other embodiments, the retention plate 40 may releasably fasten to the leading portion 21, such that the leading portion 21 is equipped with buttons, straps, hook-and-loop fasteners, snaps, or the like, to fasten to corresponding components on the retention plate 40. Other suitable structures for coupling the retention plate 40 to the leading portion 21 may include bolts, rivets, screws, or the like. Further, adhesives may be appropriate in certain circumstances to attach the retention plate 40 to the leading portion 21.

FIG. 3 is a perspective view of a cargo retainer having a removable retention anchor, in accordance with various embodiments of the present invention. As shown, the retention plate 40 may serve as a structure to which a retention anchor 30 may be coupled. In some embodiments, the retention anchor 30 may be unitary with the retention plate 40 or formed from a contiguous material. In other embodiments, an interchangeable retention anchor 30 may be removably attached to the retention plate 40 at a plurality of locations on the retention plate 40. In such instances, a suitable mechanism may be provided for coupling the retention plate 40 to the retention anchor 30.

The retention plate 40 may be constructed of any suitable material for hauling cargo, including metal, plastic, hardened rubber, or a composite. In some instances, it may be desirable for the retention anchor to have a protective coating so as to minimize the damage to surfaces, like a truck bed, tailgate, trunk, body of the vehicle, or the like.

The retention anchor 30 may include a top portion 32 and a cleat portion 33, and at least one face 34. The top portion 32 generally attaches to the leading portion 21 or the retention plate 40 by any suitable coupling means. For instance, retention anchor 30 may be fixed to leading portion 21 or the retention plate 40 by a manufacturing process like crimping, stamping, clamping, or pressing, for example. In other embodiments, the retention anchor 30 may releasably fasten to leading portion 21, such that leading portion 21 is equipped with buttons, straps, hook-and-loop fasteners, snaps, or the like, to fasten to corresponding components on the retention anchor 30. Other suitable means for coupling the retention anchor 30 to leading portion 21 may include bolts, rivets, screws, or the like. Further, adhesives may be appropriate in certain circumstances to attach the retention anchor 30 to the leading portion 21.

A retention anchor 30 can be situated in any suitable configuration along the leading portion 21 or the retention plate 40. The retention anchor 30 may be configured to extend conterminously with leading portion length, $L_{LP}$. In other embodiments, the retention anchor 30 could extend a portion of the length of the leading portion, $L_{LP}$. In certain embodiments, such as that shown in FIG. 3, a plurality of retention anchors 30 may be spaced across the leading portion 21 or the retention plate 40. Due to the differences between makes and models of vehicles, it may be desirable for the retention anchors 30 to have various configurations along the leading portion 21.

In some embodiments, the retention anchor 30 is removably coupled to the retention plate 40 and selectively positionable at a plurality of locations on the retention plate 40. In such instances, a protrusion 41 extending from the retention plate 40 mates with a recess 31 formed on a face 34 of the top portion 32 of the retention anchor 30. In some embodiments, the recess 31 may be a groove, channel, notch, hole, or detent. The recess 31 could also include a series of grooves, notches, holes, or detents. The recess 31 may have any desirable cross-section, such as a dovetail, T-slot, or the like. The protrusion 41 may have a cross-section of any suitable shape corresponding to the recess 31.

Figure 4:
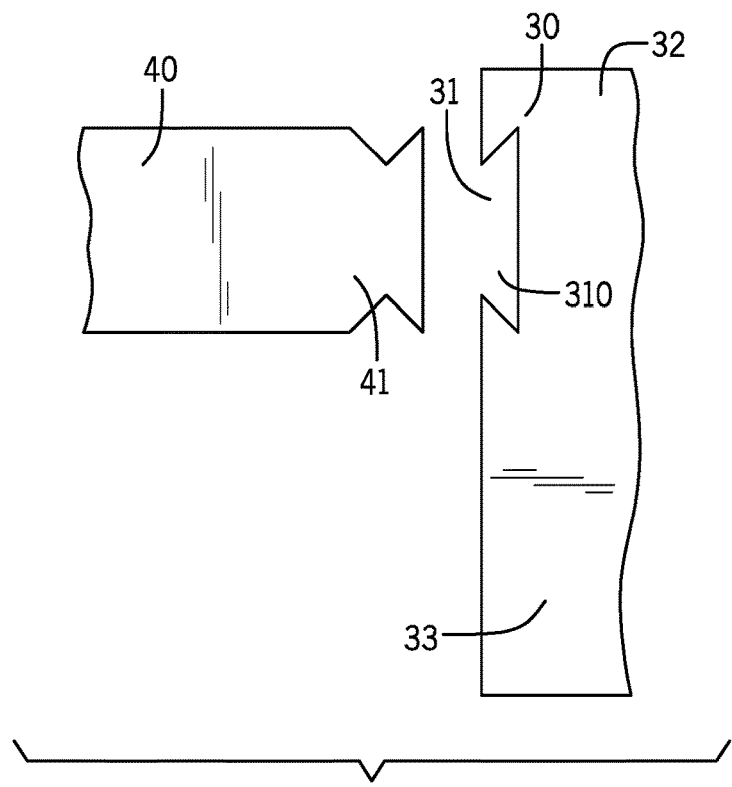
FIG. 4 is a side view of a retention plate coupling with the retention anchor via a tongue-and-groove coupling, in accordance with various embodiments of the present invention.

FIG. 4 is a side view of a retention anchor 30 coupling with a retention plate 40 via a dovetail coupling, in accordance with various embodiments of the present invention. In the illustrated embodiment, the recess 31 comprises a channel 310 for engaging the protrusion 41 on the retention plate 40. The channel 310 longitudinally extends from a first retention anchor end to a second retention anchor end thereby extending the length of the retention anchor 30. As such, the retention anchor 30 can slide relative to the corresponding protrusion 41 in the retention plate 40. In that manner, the retention anchor 30 can be slidably removed from retention plate 40 or placed at numerous locations along the protrusion 41.

The channel 310 and corresponding protrusion 41 shown in FIG. 4 have dovetail cross-sections. Numerous other suitable cross-sections may be used to couple the protrusion 41 to the retention anchor 30, such as a T-slot. Additionally, a plurality of channels 310, like a series of teeth or a finger joint, may be used to couple the retention anchor 30 to the retention plate 40.

Figure 5A:
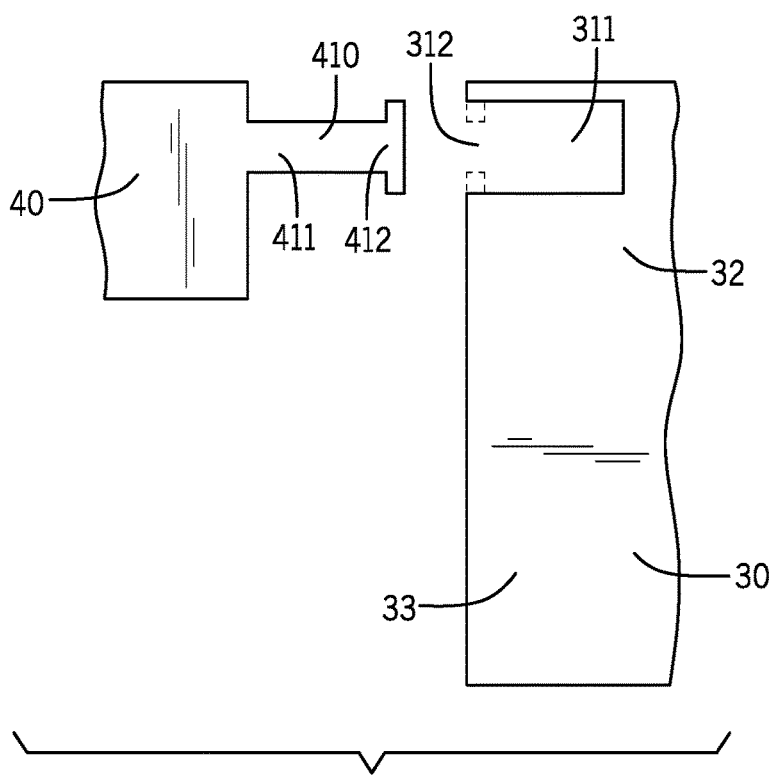
FIG. 5A is a side view of a retention plate coupling with the retention anchor via a pin-and-notch coupling, in accordance with various embodiments of the present invention.
Figure 5B:
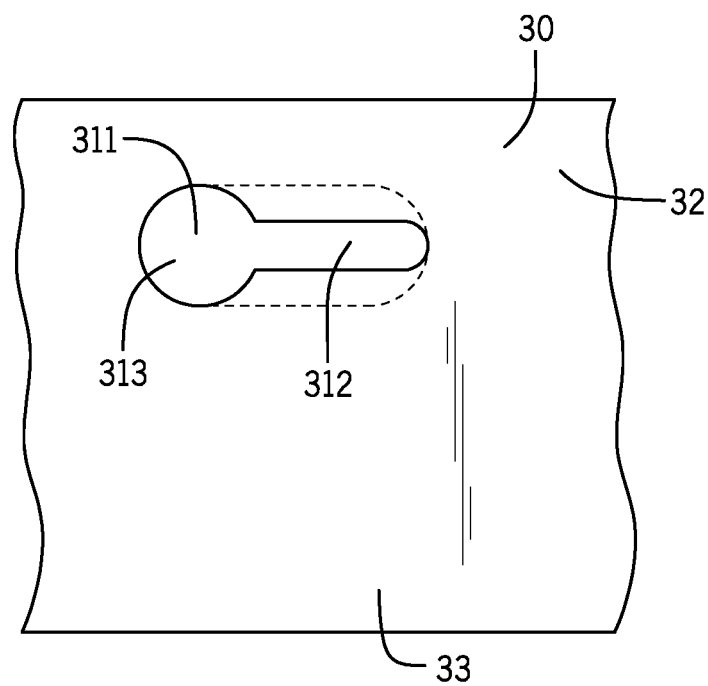
FIG. 5B is a front view of the retention anchor of FIG. 5A.
Figure 5C:
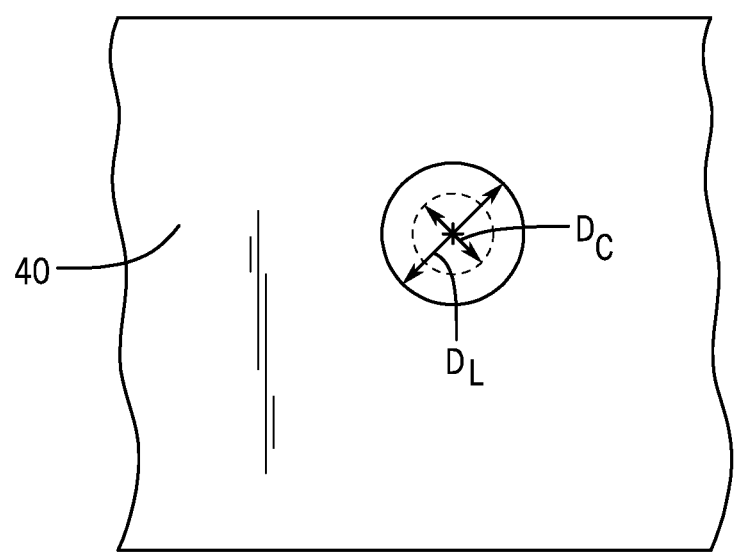
FIG. 5C is a front view of the retention plate of FIG. 5A.

FIG. 5A is a side view of a retention plate 40 coupling with the retention anchor 30 via a pin-and-notch coupling, FIG. 5B is a front view of the retention anchor 30 of FIG. 5A, and FIG. 5C is a front view of the retention plate 40 of FIG. 5A, all in accordance with various embodiments of the present invention. The pin 410, when concentric with the notch 311, engages the notch 311 and then slides in a groove 312 longitudinally extending from the notch 311 across the face 34 of the top portion 32, thereby locking the pin 410 within the notch 311.

The pin 410 includes a column 411 protruding from the retention plate 40 and having a lip 412 formed near the distal end of the pin 410. The column 43 has a column diameter, $D_C$, that is less than the lip diameter, $D_L$. Although the embodiment in FIGS. 5A-C shows a cylindrical column having an annular lip, it should be appreciated that the column 411 and lip 412 may have any suitable geometric cross-section.

In the illustrated embodiment, the notch 311 comprises a corresponding cylindrical recess 313 having approximately the same diameter as the lip diameter, $D_L$, and an elongated groove 312 longitudinally extending from the cylindrical recess 313. The elongated groove 312 has a slightly larger diameter as the diameter of the column, $D_C$, such that, after the pin 410 has been inserted into the cylindrical recess 313, it may slide from the cylindrical recess 313 through the groove portion 312. Because the groove's diameter is less than the lip diameter, $D_L$, the pin 410 is prevented from disengaging the notch in a direction parallel to the pin's central axis.

Figure 6:
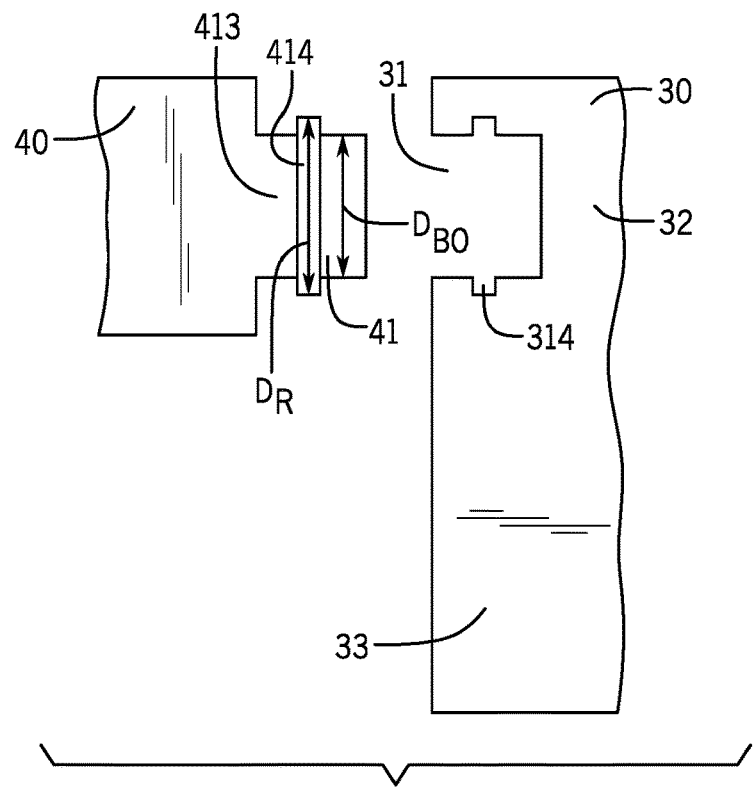
FIG. 6 is a side view of a retention plate coupling with the retention anchor via a snap-fit coupling, in accordance with various embodiments of the present invention.

FIG. 6 is a side view of a retention plate 40 coupling with the retention anchor 30 via a snap-fit coupling, in accordance with various embodiments of the present invention. As shown, the protrusion 41 snap fits into the recess 31. In some embodiments, the protrusion 41 and the recess 31 may form an annular snap fit when coupled, such as a snap button or the like. The protrusion 41 may include a body 413 having a body diameter, $D_{BO}$, and a ridge 414 having a ridge diameter, $D_R$, greater than the body diameter, $D_{BO}$. The ridge 414 may have any suitable shape for engaging a detent 314 in the recess 31. The ridge 414 could be rounded, beveled, beaded, chamfered, or rectangular, for example, so long as the corresponding detent 314 for receiving the ridge 414 has a substantially similar profile. The recess 31 is adapted to be substantially concentric with the protrusion 41 and the detent 314 is configured to receive the ridge 414. The detent 314 has a diameter substantially similar to the ridge diameter, $D_R$. In other embodiments, a plurality of detents 314 and protrusions 41 may be used to couple the retention anchor 30 with retention plate 40.

Figure 7:
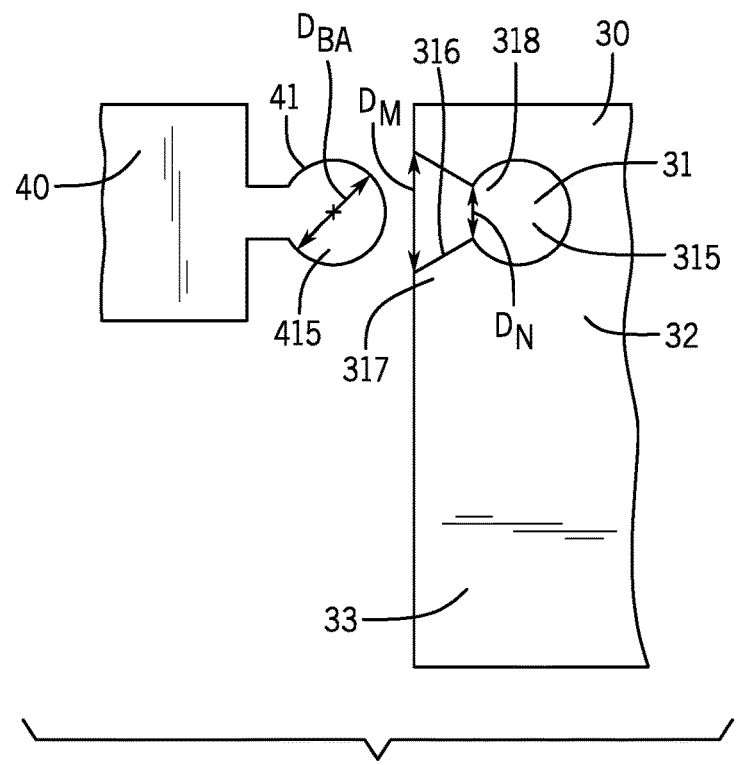
FIG. 7 is a side view of a retention plate coupling with the retention anchor via a ball-and-socket coupling, in accordance with various embodiments of the present invention.

FIG. 7 is a side view of a retention plate 40 coupling with the retention anchor 30 via a ball-and-socket coupling, in accordance with various embodiments of the present invention. As shown, the protrusion 41 comprises a ball 415 and the recess 31 comprises a socket 315, thereby forming a ball-and-socket snap fit when coupled. The ball 415 and the socket 315 would have substantially the same diameters to allowing coupling. Additionally, a chamfer section 316 may be formed in the face 34 of the top portion 32 to allow the ball 415 to mate with the socket 315. The chamfer section 316 includes a mouth 317 and a neck 318, wherein the mouth 317 narrows to the neck 318 such that the diameter of the mouth, $D_M$, is at least as large as the diameter of the ball, $D_{BA}$, and the diameter of the neck, $D_N$, is less than the diameter of the ball, $D_{BA}$. There may be a plurality of balls 415 disposed on the retention plate 40 with a corresponding plurality of sockets 315 formed in the retention anchor 30 in any suitable configuration.

Figure 8:
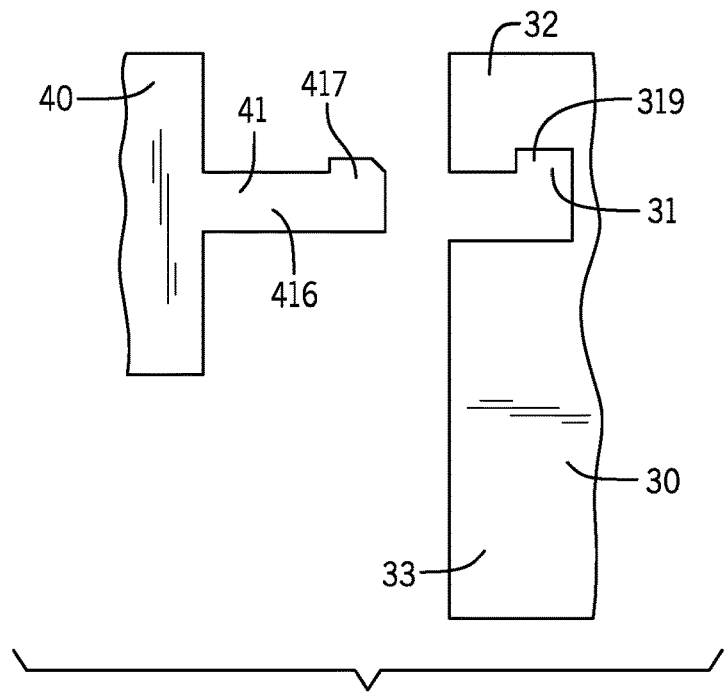
FIG. 8 is a side view of a retention plate coupling with the retention anchor via a cantilever snap-fit coupling, in accordance with various embodiments of the present invention.

FIG. 8 is a side view of a retention plate 40 coupling with the retention anchor 30 via a cantilever snap-fit coupling, in accordance with various embodiments of the present invention. In the illustrated embodiment, the protrusion 41 comprises a beam 416 having an overhang 417 disposed on the distal end of the beam 416. The recess 31 comprises an indentation 319 configured to receive the overhang 417 thereby forming a cantilever snap fit when coupled. When the cantilevered beam 416 is inserted into the recess 31, the cantilever beam 416 and top portion 32 may deflect relative to one another thereby widening the recess 31 to allow the overhang 417 to engage the indentation 319. In a preferred embodiment, the overhang 417 and the indentation 319 would have substantially the same profiles, as shown in FIG. 8. In other embodiments, there may be a plurality of beams 416 disposed on the retention plate 40 with a corresponding plurality of recesses 31 having indentations 319 formed in the retention anchor 30 in any suitable configuration.

Other embodiments for coupling the retention plate 40 with the retention anchor 30 may include a moveable jaw structure, like a clamp, latch, or clasp. The moveable jaw structure, together with the top portion 32 of the retention anchor, may form a recess 31. The moveable jaw structure could then be used to engage and secure a protrusion 41 disposed on the retention plate 40.

Figure 9:
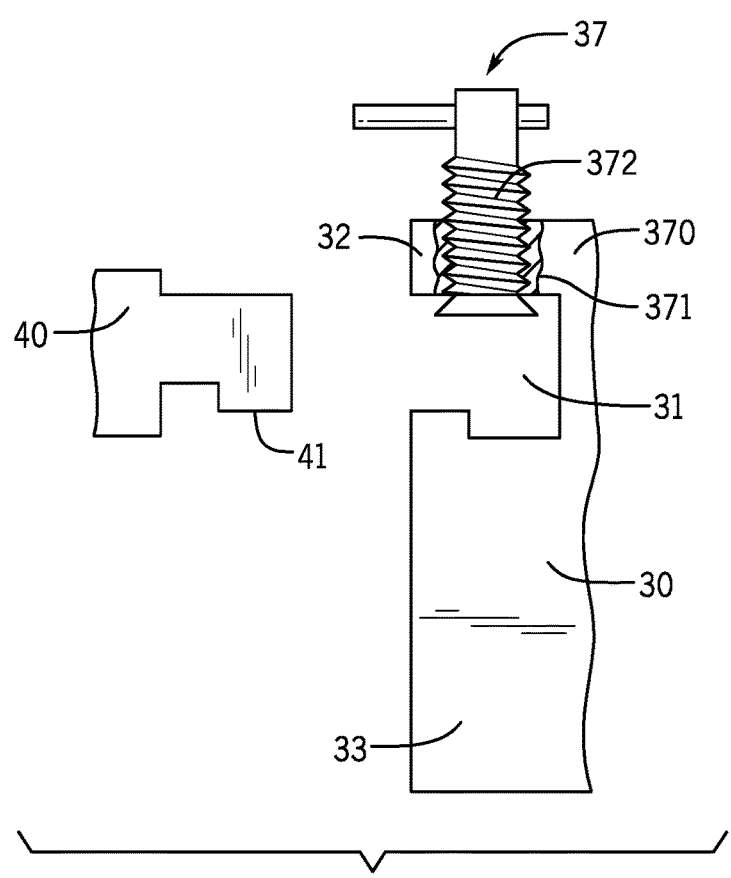
FIG. 9 is a side view of a retention plate coupling with the retention anchor with a screw-type coupling, in accordance with various embodiments of the present invention.

For example, FIG. 9 shows a side view of a retention plate 40 coupling with the retention anchor 30 with a screw-type clamp coupling, in accordance with various embodiments of the present invention. As shown, top portion 32 of the retention anchor 30 includes a moveable jaw structure 37 that further includes a screw-type clamp 370. The top portion 32 at least partially forms a recess 31 and has a threaded bore 371 extending from the recess 31 for receiving a screw 372. When the protrusion 41 is inserted into the recess 31, the screw 372 may be tightened against a surface of the protrusion 41.

In some embodiments, the protrusion 41 and the recess 31 may have substantially similar profiles; however, it is contemplated that any suitable geometric profile may be used. In other embodiments, there may be a plurality of screws 372 disposed on the retention anchor 30 with a corresponding threaded bore 371 formed in the top portion 32 of the retention anchor 30.

Figure 10A:
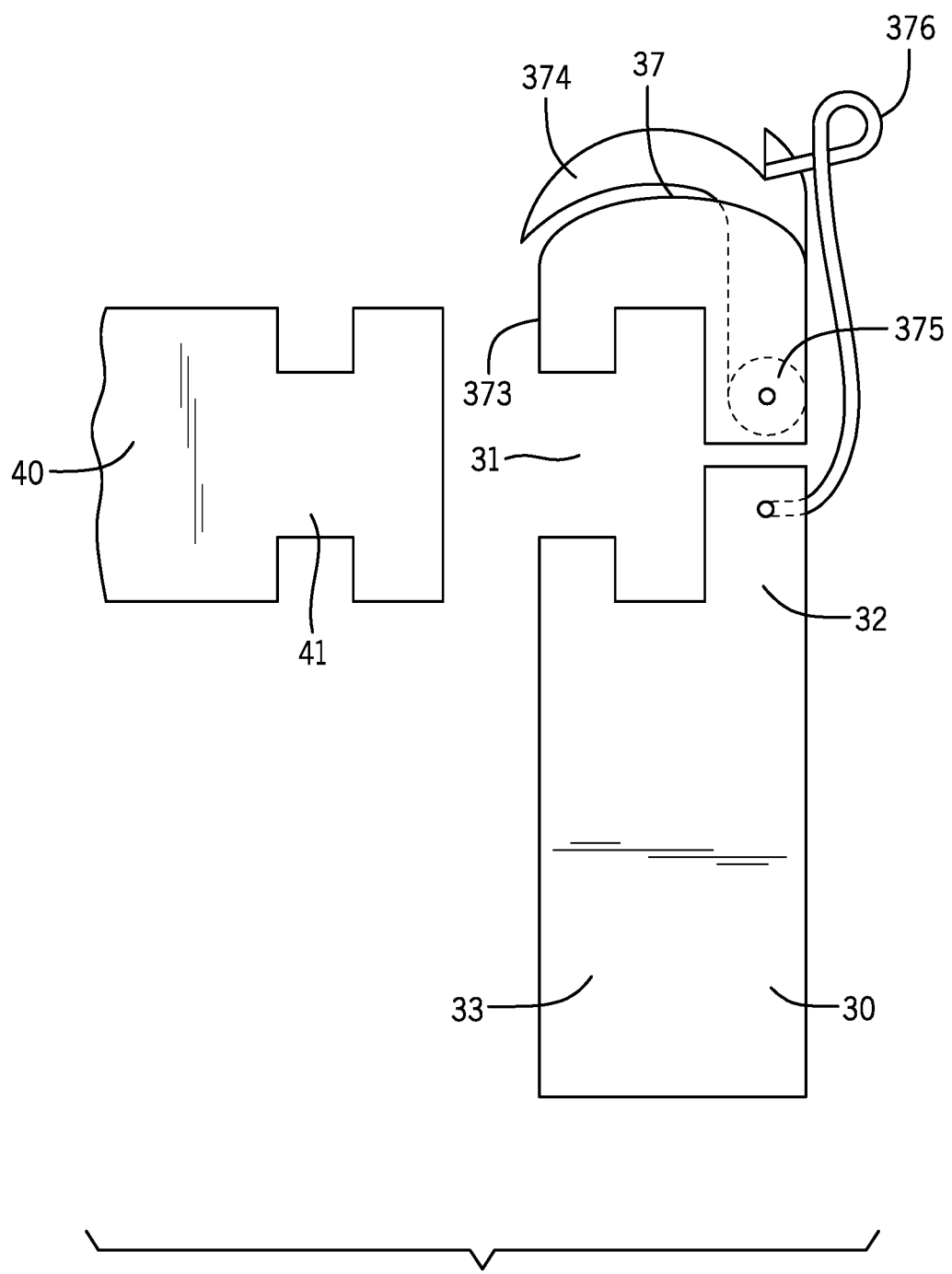
FIG. 10A is a side view of a retention plate coupling with the retention anchor via a latching coupling, in accordance with various embodiments of the present invention, wherein the retention anchor is in a closed position.
Figure 10B:
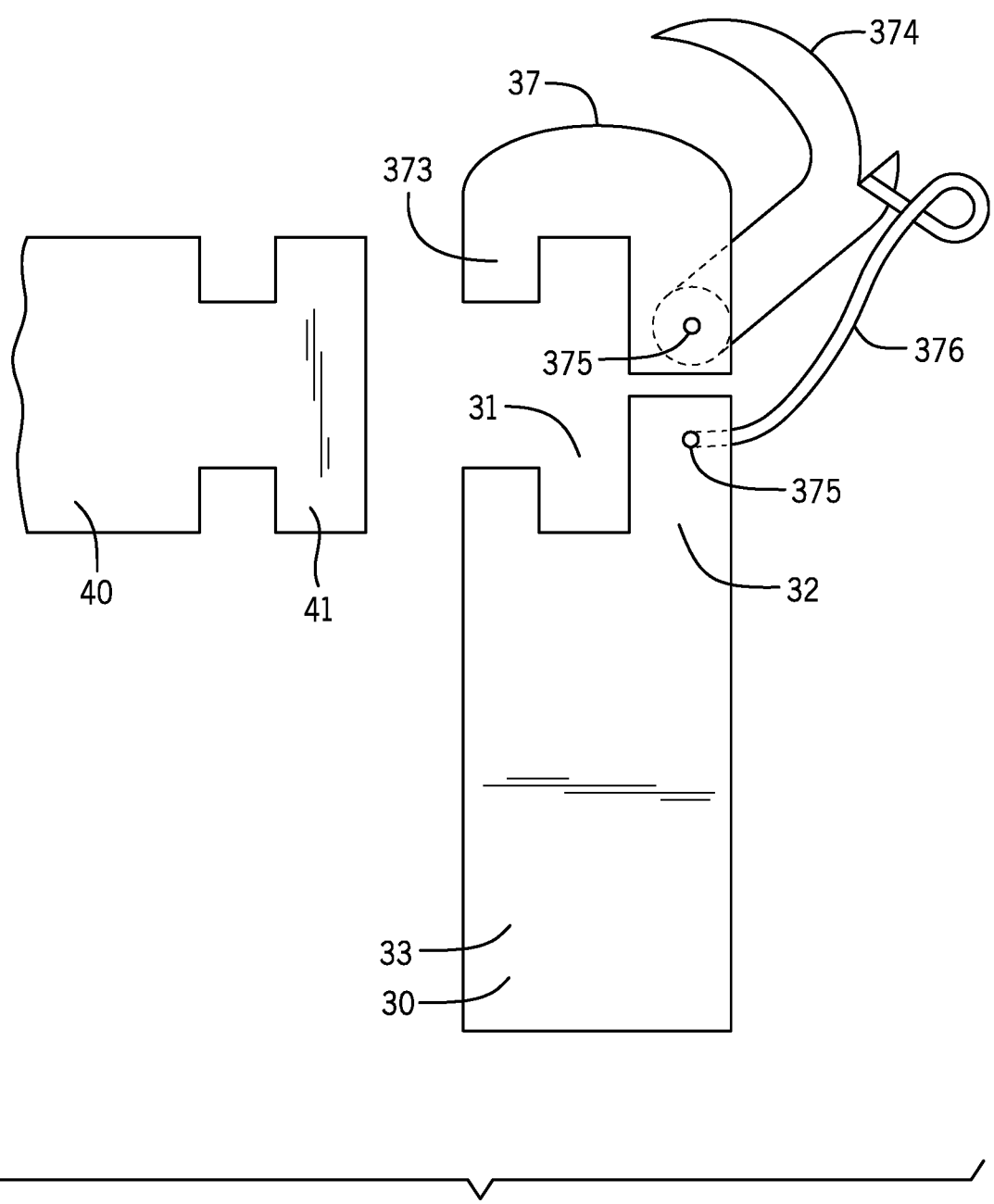
FIG. 10B is a side view of a retention plate coupling with the retention anchor via a latching coupling, in accordance with various embodiments of the present invention, wherein the retention anchor is in an open position.

FIGS. 10A and 10B are a side views of a retention plate coupling with the retention anchor via a latching coupling, in accordance with various embodiments of the present invention, wherein the retention anchor is in closed and open positions, respectively. In the illustrated embodiment, the moveable jaw structure 37 includes a hinged portion 373 forming a recess 31 with the top portion 32. The hinged portion 373 further includes a latch assembly 374 rotatably connected to at least one hinge 375 disposed in the hinged portion 373. The latch assembly 374 includes a tension member, or the like, coupling the top portion 32 to the hinged portion 373. The latch assembly 374 may be rotated from a locked position to an unlocked position thereby engaging and disengaging a protrusion 41. When the latch assembly 374 is in the locked position, the tension spring 376 pulls the hinged portion 373 toward the top portion 32 thereby fixing the hinged portion 373 relative to the top portion 32. When the latch assembly 374 is released and rotated to an unlocked position, the hinged portion 373 may substantially freely rotate relative to the top portion 32 thereby enlarging the recess 31. In the unlocked position, the protrusion 41 may be inserted into the enlarged recess 31. Upon the protrusion 41 engaging a recess 31 corresponding to the geometric profile of the protrusion 41, the latch assembly 374 may be rotated to a locked position thereby clamping the protrusion 41 between the hinged portion 373 and the top portion 32.

As noted above, the protrusion 41 and the recess 31 have substantially similar profiles, such as a T-slot, as shown in FIGS. 10A-B; however, it is contemplated in this disclosure that any suitable geometric profile may be used. In other embodiments, there may be a plurality of hinged portions 373 and associated latch assemblies 374 disposed on the retention anchor 30 for mating with a plurality of protrusions 41.

Figure 11:
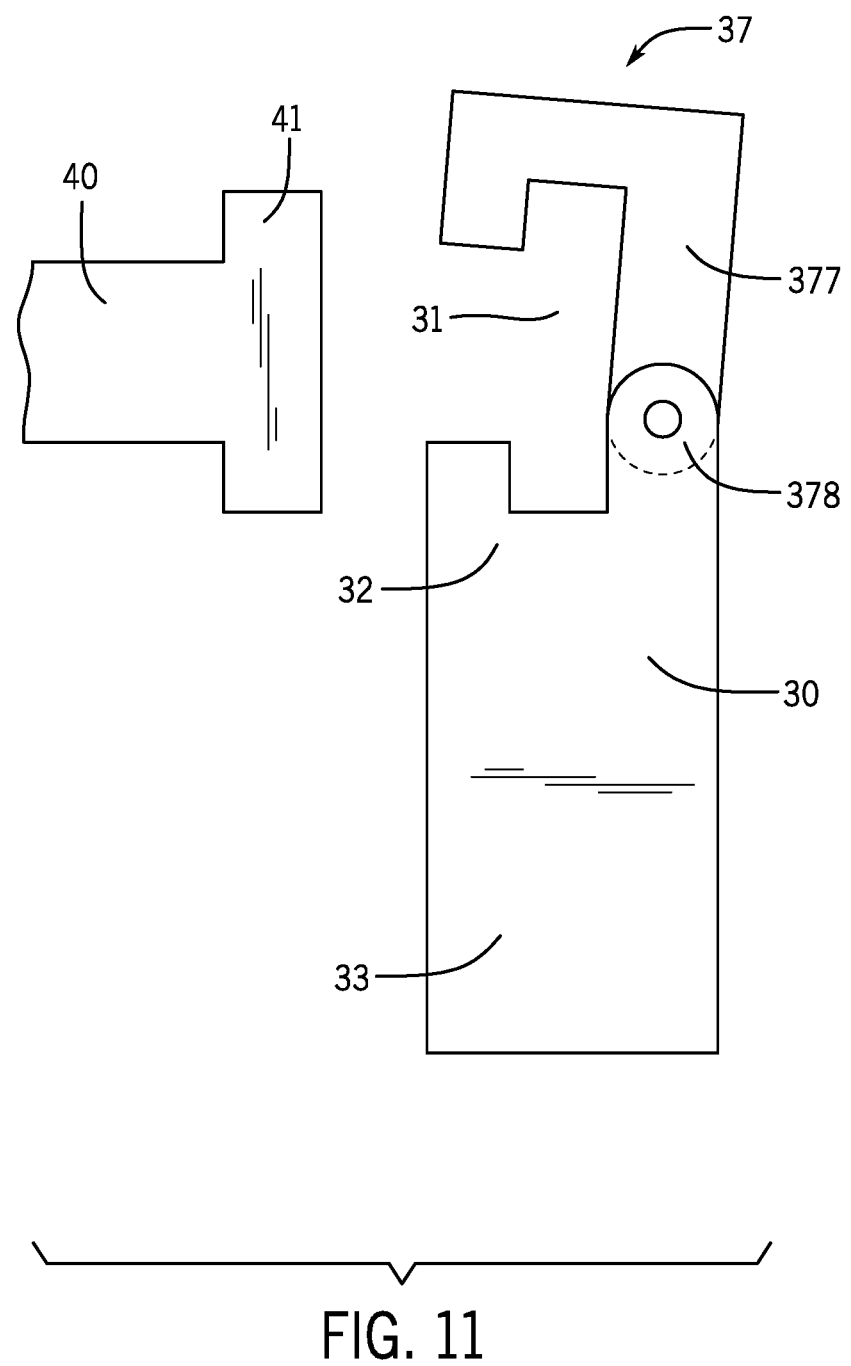
FIG. 11 is a side view of a retention plate coupling with the retention anchor via a spring clamp, in accordance with various embodiments of the present invention.

FIG. 11 is a side view of a retention plate coupling with the retention anchor via a spring clamp, in accordance with various embodiments of the present invention. The embodiment of FIG. 11 includes a moveable jaw structure 37, such as a spring clamp, having a spring assembly 377, which together with the top portion 32 define a recess 31. The spring assembly 377 includes a spring biasing member 378 rotatably connected to the top portion 32. The spring assembly 377 may be rotated from a closed position to an open position thereby engaging and disengaging a protrusion 41. A user may apply a torsional force to the spring assembly 377 to rotate it from the closed position to the open position. In the open position, the recess 31 is sufficiently widened to allow the protrusion 41 to mate with any corresponding structure in the recess 31. Because the spring biasing member 378 naturally biases the spring assembly 377 toward the closed position, the spring biasing member 378 will return the moveable jaw structure 37 to the closed position when a user stops applying force to the spring biasing member 378 thereby securing the protrusion 41 between the moveable jaw structure 37 and the top portion 32.

As noted above, the protrusion 41 and the recess 31 have substantially similar profiles, such as a T-slot, as shown in FIG. 11; however, it is contemplated in this disclosure that any suitable geometric profile may be used. In other embodiments, there may be a plurality of spring assemblies 377 and associated spring biasing members 378 disposed on the retention anchor 30 for mating with a plurality of protrusions 41.

The cleat portion 33 of the retention anchor 30 extends below the bottom side 25 and may be inserted into and retained by a gap 3 of the vehicle. Gaps 3 differ depending on the make and model of a vehicle and the distance between the cargo area 2 and the body of the vehicle 1. For example, the cleat portion 33 may be inserted into a gap 3 formed between a tailgate and truck bed. In other instances, the cleat portion 33 may be inserted behind a bumper of a vehicle. Oftentimes, however, the cleat portion 33 may only fill a portion of a width of such a gap 3. In those instances, there may be space for the cleat portion 33 to move within the gap 3 and relative to the cargo area 2, thus increasing the risk of the cargo retainer 10 coming loose during use as well as potentially increasing noise or "chatter" of the part. Therefore, to ensure the retention anchor 30 is effectively secured in gaps 3 of various widths, some embodiments may include a universal retention anchor 30 with an adjustable thickness to accommodate any gap or any part of a vehicle thus substantially filling the gap 3 between the bed and tailgate, for example.

To accommodate the various gap widths, the retention anchor 30 may further comprise a deformable member 38 adapted to adjust in size. Some embodiments for an adjustable retention anchor 30 having a deformable member 38 are shown in FIGS. 12A-15B.

Figure 12A:
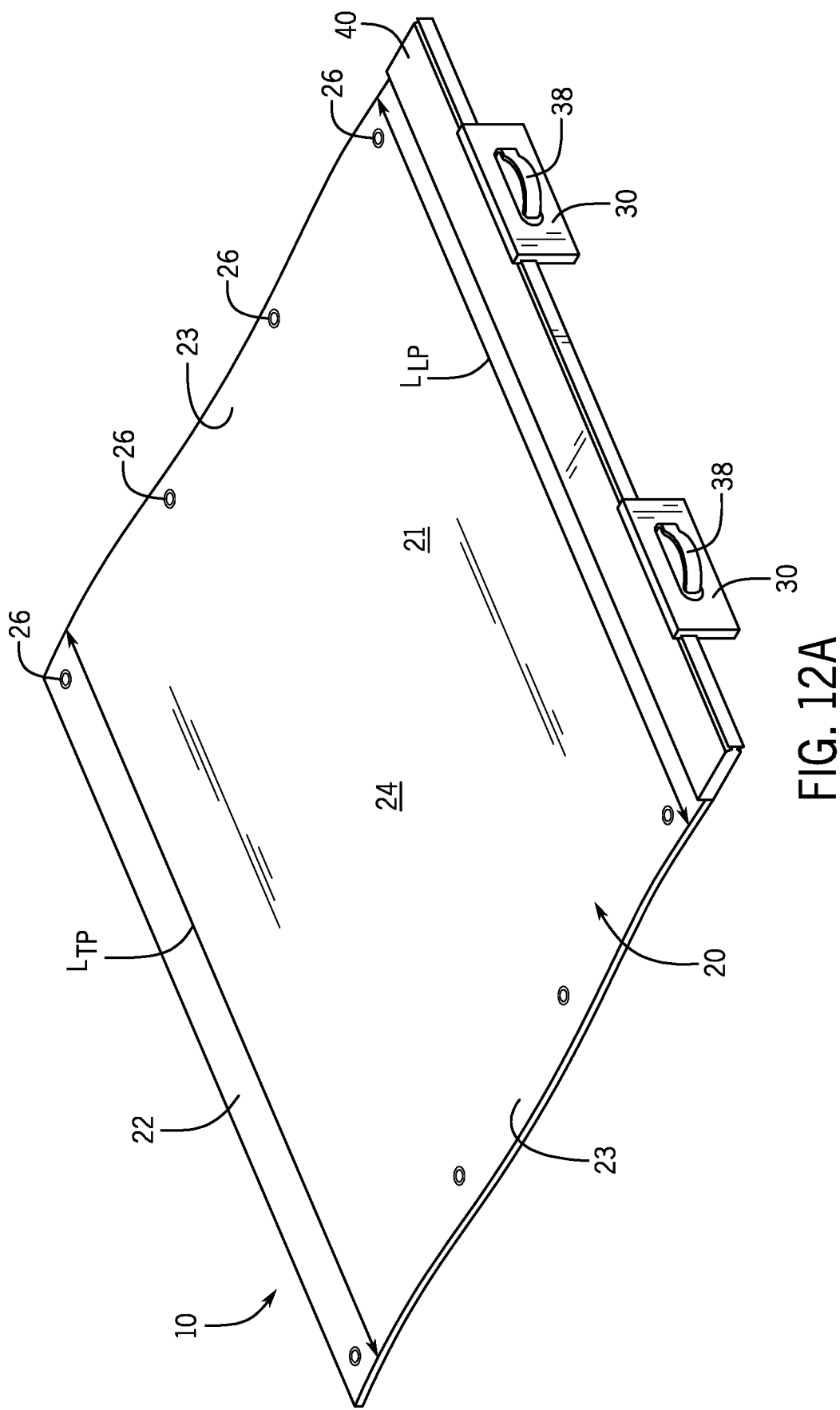
FIG. 12A is a perspective view of a cargo retainer having a retention anchor with a deformable member, in accordance with various embodiments of the present invention.
Figure 12B:
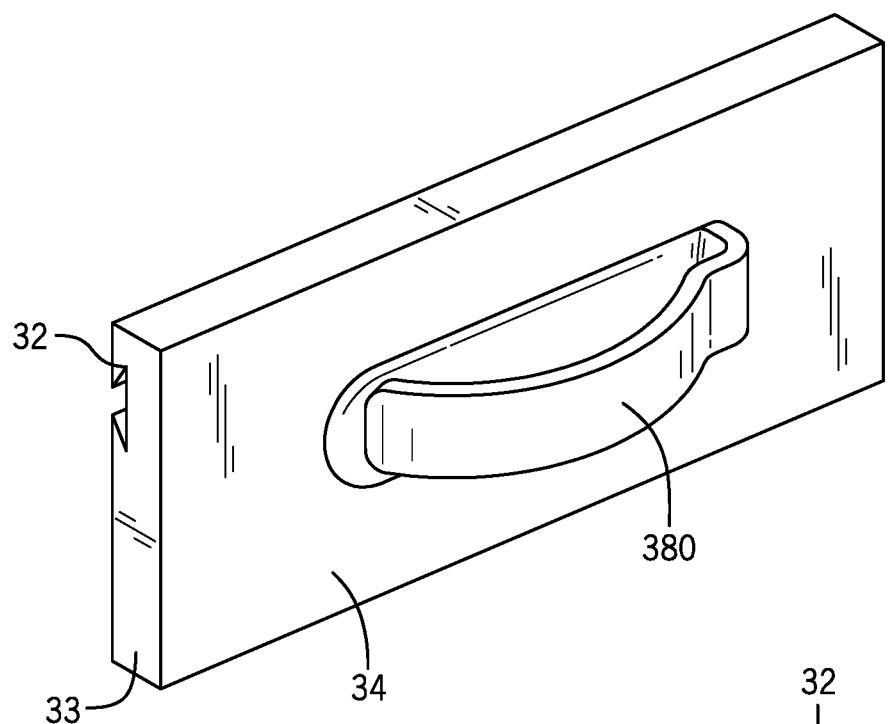
FIG. 12B is a perspective view of a retention anchor of FIG. 12A.
Figure 12C:
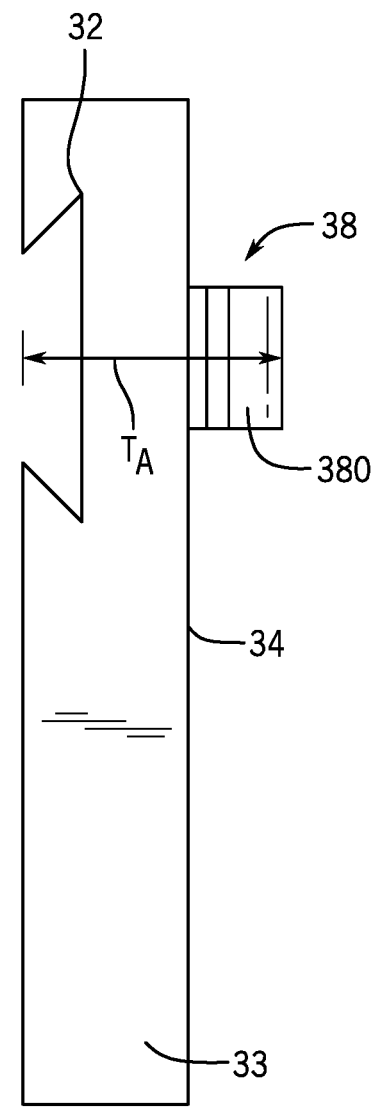
FIG. 12C is a side view of the retention anchor of FIG. 12B.

FIG. 12A is a perspective view of a cargo retainer 10 having a retention anchor 30 with a deformable member 38, FIG. 12B is a perspective view of a retention anchor 30 of FIG. 12A, and FIG. 12C is a side view of the retention anchor 30 of FIG. 12B, all in accordance with various embodiments of the present invention. In some embodiments, such as the illustrated embodiment, the face 34 has a deformable member 38, such as a spring clip or spring finger, disposed on or integrated therewith, that may deform such that the overall thickness of the retention anchor, $T_A$, is variable. In the illustrated embodiment, a clip 380 protrudes from the face 34. When the cleat portion 33 is inserted between a tailgate and a truck bed, for example, the clip 380 may contact the truck bed thereby wedging the cleat portion 33 between the truck bed and tailgate thereby limiting the movement of retention anchor 30 within the gap.

Figure 13A:
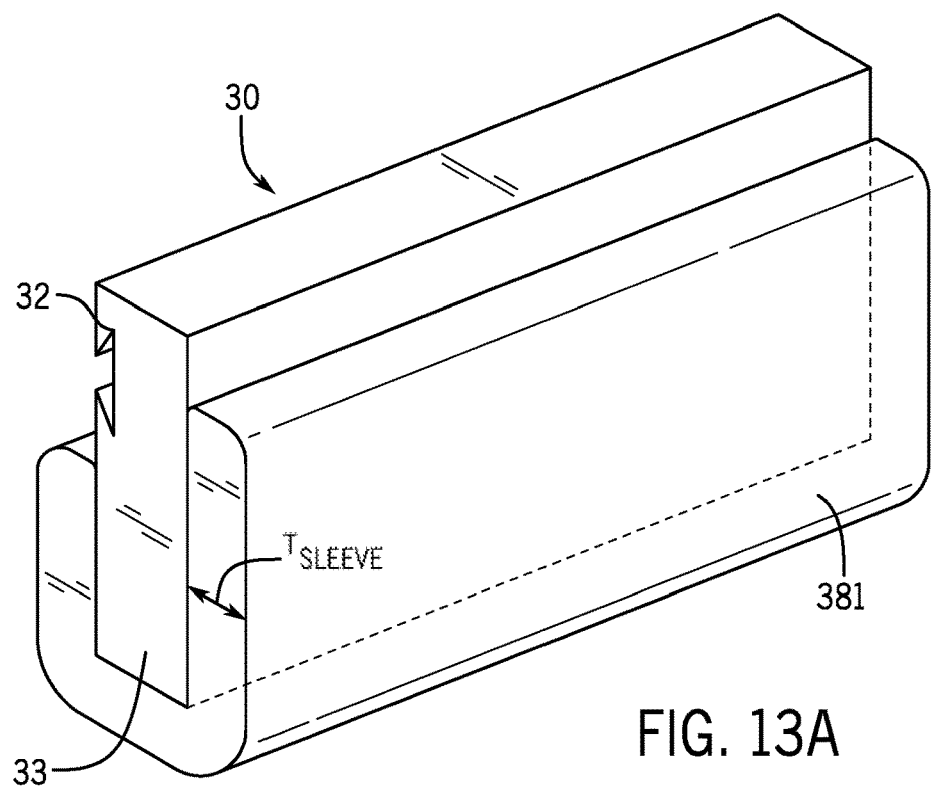
FIG. 13A is a perspective view of a retention anchor including a deformable sleeve, in accordance with various embodiments of the present invention.
Figure 13B:
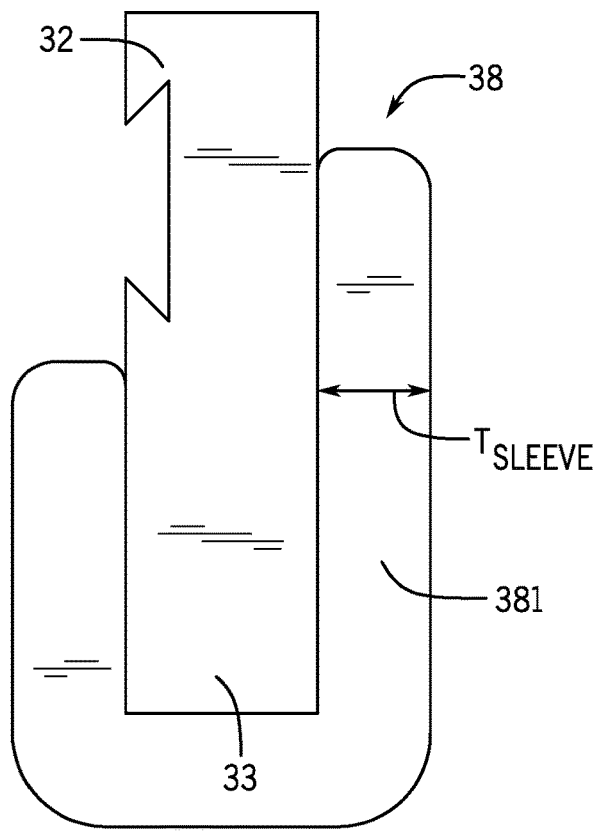
FIG. 13B is a side view of the retention anchor of FIG. 13A.

It may be desired that a retention anchor 30 have deformable accessories, such as sleeves, casings, or sheaths, to ensure the gap 3 between vehicle parts is filled thereby limiting movement of the retention anchor 30 relative to the vehicle. FIGS. 13A and 13B are perspective and side views, respectively, of a retention anchor 30 including a deformable sleeve 381, both in accordance with various embodiments of the present invention. The sleeve 381 comprises a deformable material, such as foam or rubber, disposed on a face of the cleat portion 33. In some instances, the sleeve 381 may partially surround the cleat portion 33 and be disposed on multiple faces. The sleeve 381 may also extend the length of the retention plate 30, if desired. To accommodate different gap widths, it is contemplated that the thickness of sleeve, $T_{SLEEVE}$, can be variable, and sleeve 381 may be interchangeable with similar sleeves or casings, e.g., of varying thicknesses.

Figure 14A:
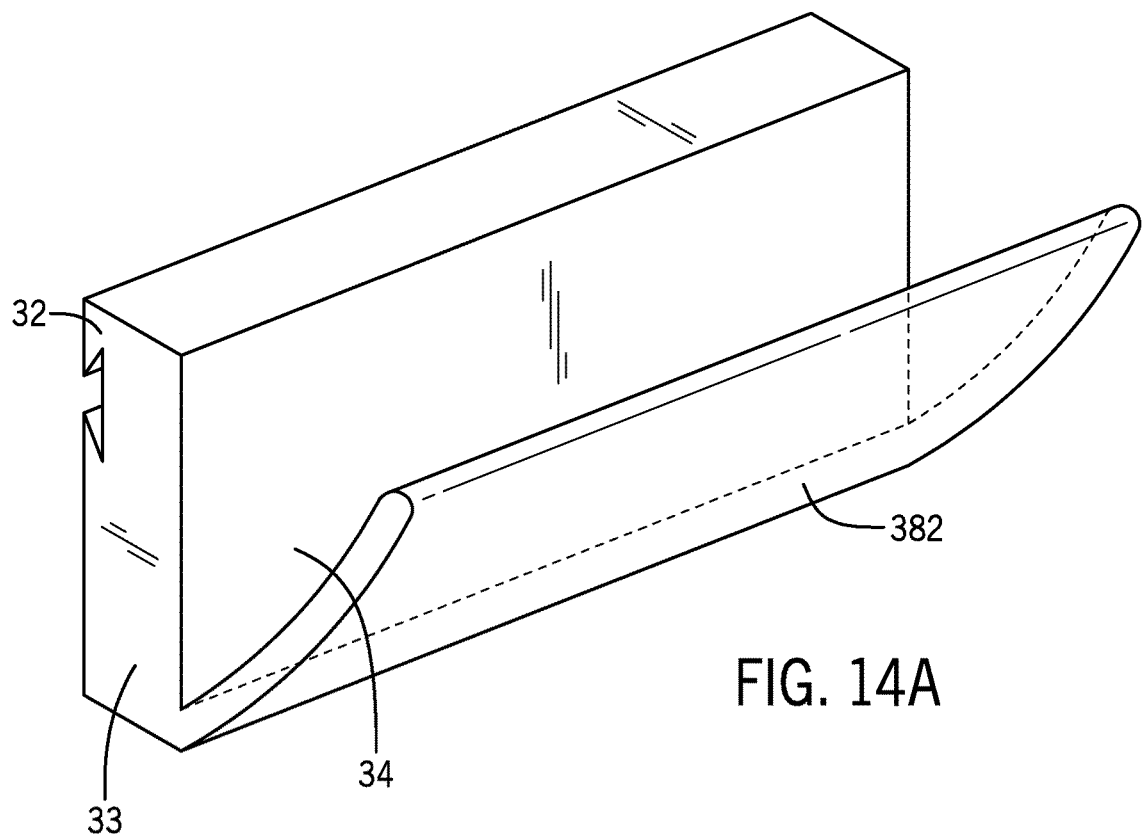
FIG. 14A is a perspective view of a retention anchor including a deformable flange, in accordance with various embodiments of the present invention.
Figure 14B:
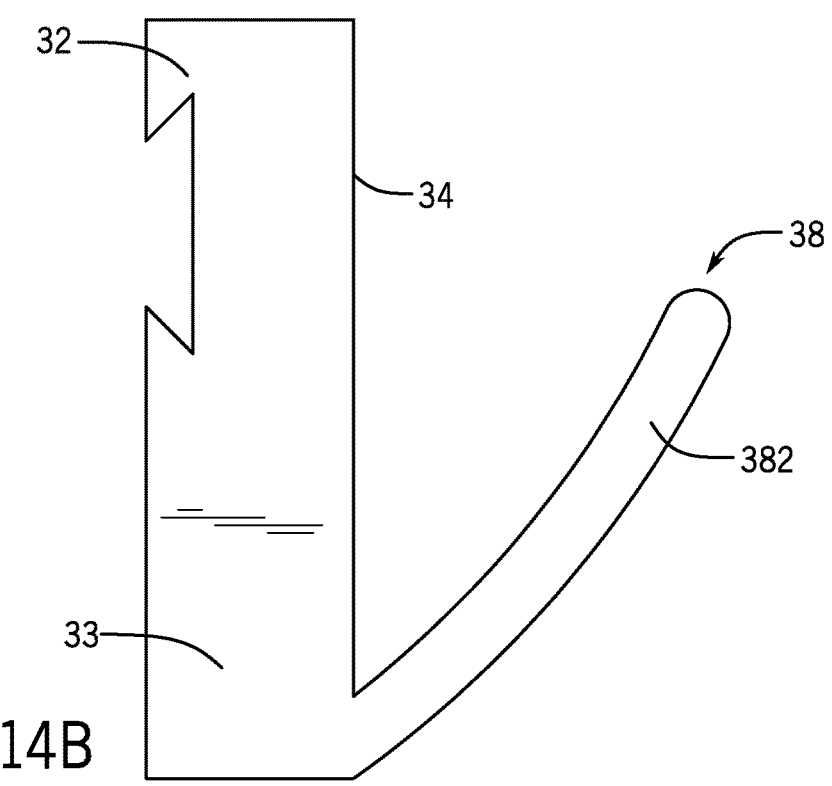
FIG. 14B is a side view of the retention anchor of FIG. 14A.

FIGS. 14A and 14B are perspective and side views, respectively, of a retention anchor 30 including a deformable flange, in accordance with various embodiments of the present invention. As shown, a flange 382 protrudes diagonally upward from the cleat portion 33 such that, when the cleat portion 33 is inserted into the gap formed between a tailgate and a truck bed, for example, the distal end of the flange 382 contacts the truck bed and flexes toward the face 34. In other embodiments, the flange 382 may extend perpendicularly from the face 34 or any other suitable angle relative to the face 34 to ensure an interference fit. In addition, there may be a plurality of flanges 382 disposed on the cleat portion 33 for filling the gap in a vehicle. Further, rather than the flange shown, the cleat portion 33 may instead have other features, such as a foot, lip, bump or tail, that similarly extend away from the face 34.

Figure 15A:
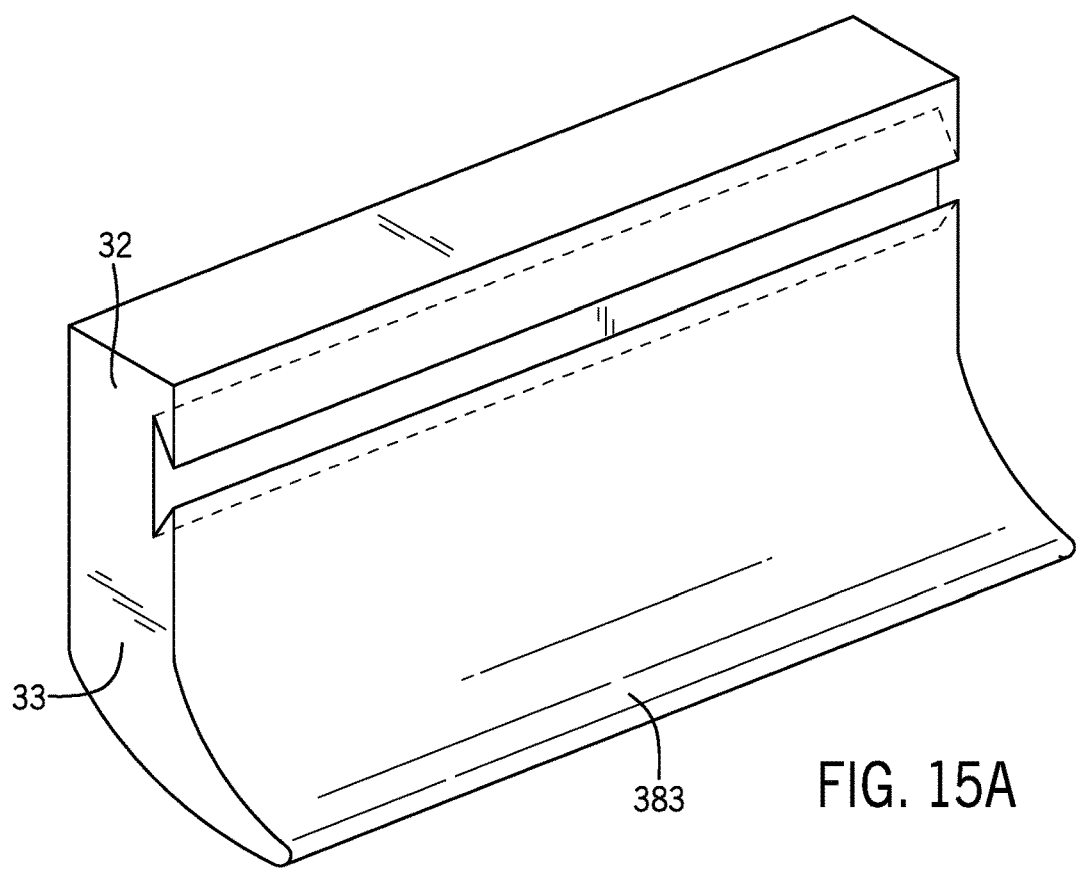
FIG. 15A is a perspective view of a retention anchor including a hook member, in accordance with various embodiments of the present invention.
Figure 15B:
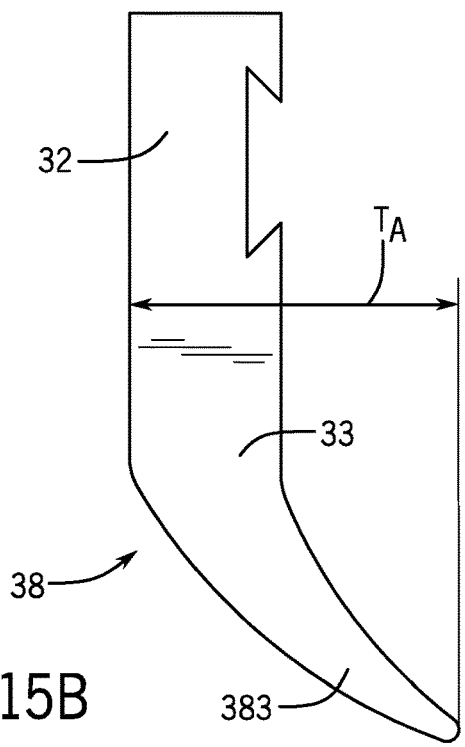
FIG. 15B is a side view of the retention anchor of FIG. 15A.

FIGS. 15A and 15B are perspective and side views, respectively, of a retention anchor 30 including a hook member 383, in accordance with various embodiments of the present invention. As shown, the cleat portion 33 includes a hook member 383 extending toward the trailing portion 22 of the mat 20. The hook member 383 curves underneath the bottom side 22 of mat 20. The hook member 383 may be deformable such that the overall thickness of the retention anchor, $T_A$, is variable. In other embodiments, the hook member 383 may extend perpendicularly from the face 34 or any other suitable angle relative to the face 34 to ensure an appropriate fit. When the cleat portion 33 is inserted between a tailgate and a truck bed, for example, the hook 383 contacts the tailgate thereby forcing the cleat portion 33 against the tailgate. It should be understood that the hook member 383 may be configured to latch or hook onto any suitable cargo area 2, like a bumper, trunk, hatch, or tailgate. In some embodiments, there may even be a plurality of hook members 383 disposed on the cleat portion 33 for coupling to the gap in a vehicle.

To accommodate the various gap widths, other embodiments may include a retention anchor 30 having multiple vertical portions that move relative to each other to adjust to the width of the gap 3. Example embodiments for an adjustable retention anchor 30 having multiple vertical members are shown in FIGS. 16A-17B.

Figure 16A:
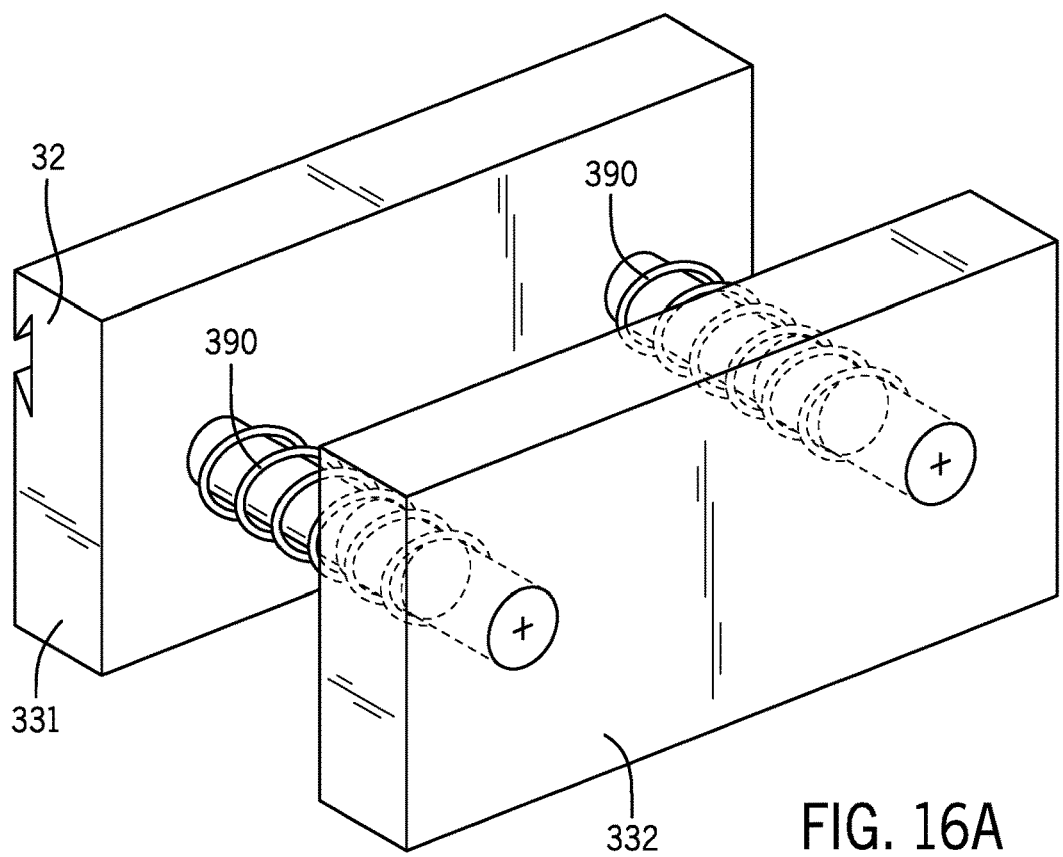
FIG. 16A is a perspective view of an adjustable retention anchor including a spring, in accordance with various embodiments of the present invention.
Figure 16B:
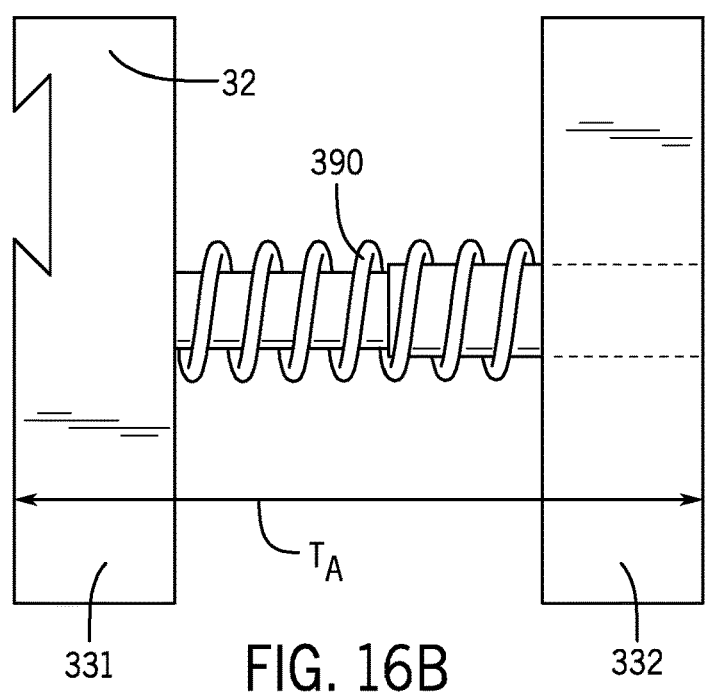
FIG. 16B is a side view of the retention anchor of FIG. 16A.

FIGS. 16A and 16B are perspective and side views, respectively, of an adjustable retention anchor 30 including a spring 390, in accordance with various embodiments of the present invention. As shown, a first generally vertical member 331 may be attached to a second generally vertical member 332 via compressible members, like springs, pistons, struts, or other spring-loaded members. In the illustrated embodiment, at least one spring-loaded member 390 couples the first generally vertical member 331 with the second generally vertical member 332 so as to bias the second generally vertical member 332 away from the first generally vertical member 331. In such instances, when the at least one spring-loaded member 390 is compressed into a compressed position, the retention anchor 30 may be inserted into a gap in a vehicle. To substantially fill the gap, the first and second generally vertical members 331, 332 may be released from the compressed position. The spring-loaded member 390 forces the first generally vertical member 331 and the second generally vertical member 332 apart until the first generally vertical member 331 contacts the tailgate and the second generally vertical member 332 contacts the truck bed, for example. Some embodiments may include a plurality of spring-loaded members 390 coupling the first and second generally vertical members 331, 332

Figure 17A:
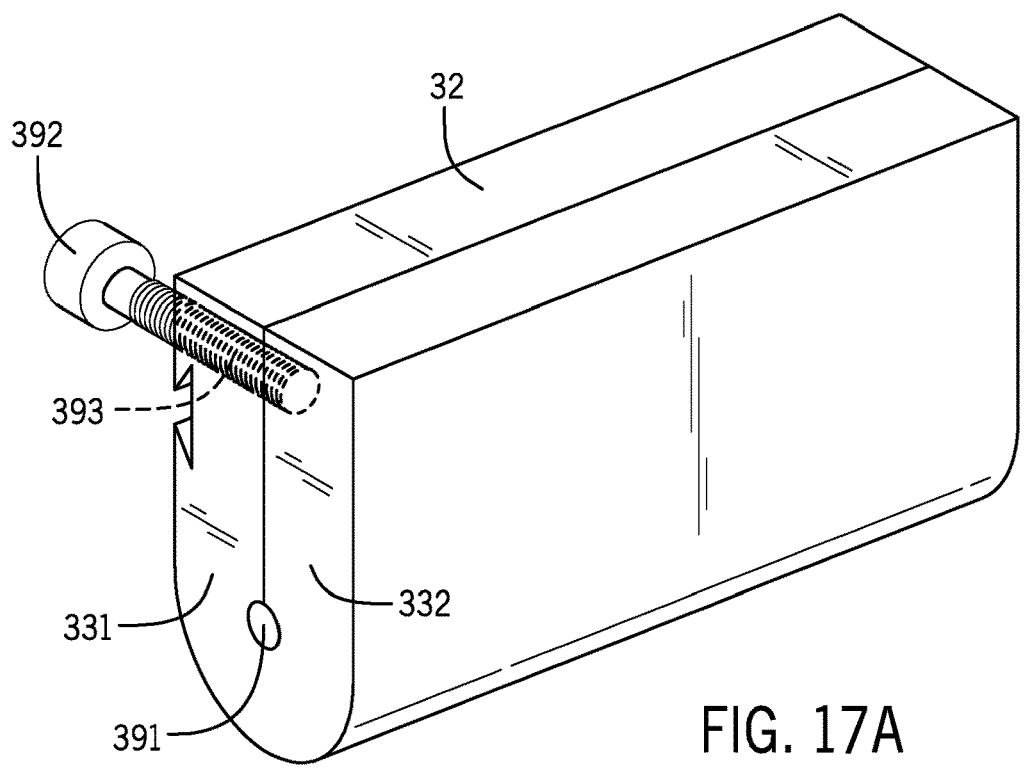
FIG. 17A is a perspective view of an adjustable retention anchor including a hinge, in accordance with various embodiments of the present invention.
Figure 17B:
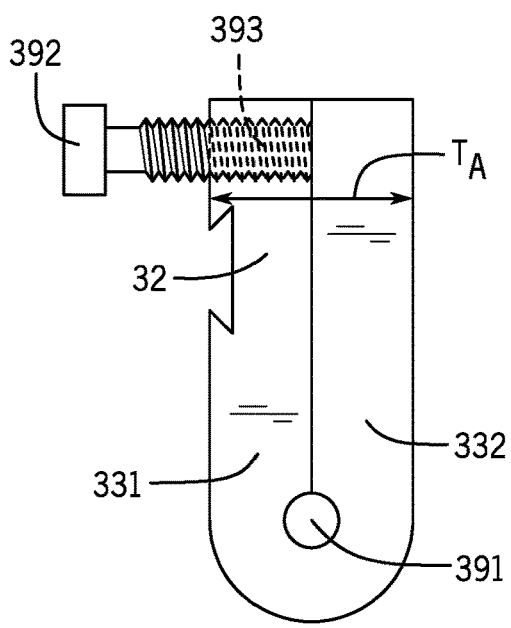
FIG. 17B is a side view of the retention anchor of FIG. 17A, wherein the retention anchor is in a closed position.
Figure 17C:
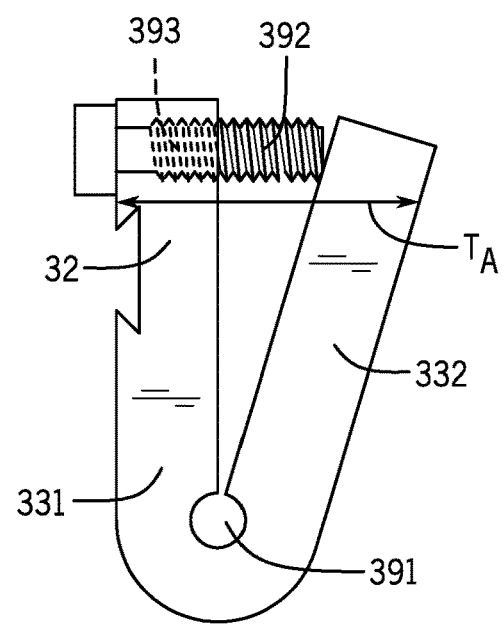
FIG. 17C is a side view of the retention anchor of FIG. 17A, wherein the retention anchor is in an open position.

FIGS. 17A, 17B, and 17C are perspective and side views of an adjustable retention anchor 30 including a hinge 391, in accordance with various embodiments of the present invention, wherein the retention anchor shown in FIGS. 17B and 17C are in closed and open positions, respectively. As shown, a first generally vertical member 331 may be hinged to a second generally vertical member 332. The hinge 391 may be located at the distal end of the cleat portion 33 or near the top portion 32. In certain embodiments, the hinge 391 could be biased, e.g., via a spring, to an open position forcing the second generally vertical member 332 to rotate away from the first generally vertical member 331, thereby changing the overall width of the retention anchor 30. In other embodiments, the second generally vertical member 332 may be manually rotated to an open position.

In various embodiments, such as shown in FIGS. 17A-C, the retention anchor 30 may include pins or screws that can be pushed or twisted to open or close the second generally vertical member 332 with respect to the first generally vertical member 331. For instance, a threaded screw 392, shown in FIGS. 17A-C, may extend through a threaded bore 393 in the first generally vertical member 331 and contact the second generally vertical member 332. Depending on how deep the screw 392 is twisted into the bore 393, the second generally vertical member 332 will proportionally rotate about the hinge 391 to the desired width. In this manner, the overall width of the retention anchor 30 can be varied to substantially fill any gap between a cargo area of a vehicle and the body of the vehicle, such as a truck bed and tailgate. In some embodiments, a plurality of pins, screws, and hinges may be used to manage the distance between the first and second generally vertical members 331, 332.

It should be appreciated that the retention anchor 30 and any accessories thereto, including clip 380, hook 383, flange 382, and first and second generally vertical members 331, 332, may be constructed of any suitable material for hauling cargo, including metal, plastic, hardened rubber, or a composite. The retention anchor 30 and retention plate 40 may be formed from the same material or may be formed from a unitary member. For example, an angle iron could form both the retention plate 40 and the retentions anchor 30. The retention plate 40 and the retention anchor 30 could also be formed from a flexible, semi-rigid, or rubberized material, or any durable material that can be molded. In some instances, it may be desirable for the retention anchor 30 to have a protective coating so as to minimize the damage to surfaces, like a truck bed, tailgate, trunk, body of the vehicle, or the like. It is further contemplated that any contacting surface or member can be textured to increase the friction between surfaces in which it contacts.

The cargo retainer 10 may be used to retain various types of cargo, such as lumber and furniture, and is not limited to any particularly kind of cargo. Furthermore, the cargo retainer 10 can be used with vehicles other than a pickup truck, such as a sport utility vehicle ("SUV"), a flatbed truck, or all-terrain vehicle ("ATV"), so long as the retention anchor 30 can couple to a vehicle body, part, or frame.

The cargo retainers 10 described herein may be easily used with numerous vehicle types and may be secured by a plurality of interchangeable retention anchors 30. In this way, a user can change the configuration of a cargo retainer 10 without the use of tools or other specialized equipment.

Thus, various embodiments provide for a cargo retainer capable of use with a variety of vehicle types to safely and securely transport oversized cargo. Some embodiments include adaptable and interchangeable retention anchors, which may be secured to various portions of vehicle bodies, including gaps and bumpers, so as to suitably retain cargo in any cargo area of a vehicle. Thus, the cargo retainer can be safely secured to personal vehicles, like pickup trucks or SUVs, thereby obviating the need for, and additional costs and expenses associated with, vehicles traditionally used to transport oversized cargo, such as semi-trailers, tractor trailers, cargo vans, flatbed trailers, or the like. The mat of the cargo retainer can also be folded in myriad ways to secure the sides and edges of the cargo and prevent movement during transit. It also allows a user to load and unload oversized materials in the normal course thus increasing the efficiencies of using a pickup truck, and decreasing the likelihood of injury to individuals. Generally, the cargo retainer according to various embodiments extends the total usable cargo area of a vehicle.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure and appended claims. Furthermore, in the detailed description of the present disclosure, numerous specific details are set forth in order to provide a thorough understanding of the disclosed embodiments. However, it will be obvious to one of ordinary skill in the art that apparatuses, systems, and methods consistent with this disclosure may be practiced without these specific details. In other instances, well known methods, procedures, components, and circuits have not been described in detail as not to unnecessarily obscure various aspects of the present disclosure.

What is claimed is:

1. A cargo retainer for use with a vehicle, comprising:
a mat having a top side, a bottom side, a leading portion, a trailing portion and an aperture for securing the trailing portion to the vehicle via a fastener;
a retention anchor configured to attach to the vehicle, the retention anchor having a top portion and a cleat portion wherein the top portion is coupled with the leading portion of the mat and the cleat portion extends away from the bottom side of the mat.

2. The cargo retainer of claim 1, further comprising a retention plate coupled between the leading portion of the mat and the top portion of the retention anchor.

3. The cargo retainer of claim 2, wherein the retention anchor and retention plate are formed from a contiguous material.

4. The cargo retainer of claim 2, wherein the retention anchor comprises a recess formed in a face of the top portion and the recess is adapted to mate with a corresponding protrusion of the retention plate.

5. The cargo retainer of claim 4, wherein the recess comprises a channel extending longitudinally from a first retention anchor end to a second retention anchor end and having a cross-section, the cross-section being substantially complementary to a cross-section of the corresponding protrusion.

6. The cargo retainer of claim 5, wherein the retention anchor is slidable along the corresponding protrusion of the retention plate via the channel.

7. The cargo retainer of claim 4, wherein the recess comprises a notch and the corresponding protrusion comprises a pin.

8. The cargo retainer of claim 4, wherein the corresponding protrusion snap fits into the recess.

9. The cargo retainer of claim 8, wherein the recess comprises a substantially annular notch and the corresponding protrusion comprises a substantially annular tip thereby forming an annular snap fit when coupled.

10. The cargo retainer of claim 8, wherein the recess comprises a socket and the corresponding protrusion comprises a ball thereby forming a ball-and-socket snap fit when coupled.

11. The cargo retainer of claim 2, further comprising a moveable jaw structure at least partially forming a recess with the top portion of the retention anchor and selectively mating the recess to a corresponding protrusion of the retention plate.

12. The cargo retainer of claim 11, wherein the moveable jaw structure comprises a screw-type clamp having a screw for coupling the retention anchor to the retention plate.

13. The cargo retainer of claim 11, wherein the moveable jaw structure comprises a hinge for rotatably coupling the retention anchor to the retention plate.

14. The cargo retainer of claim 11, wherein the moveable jaw structure comprises a spring biasing member for coupling the retention anchor to the retention plate.

15. The cargo retainer of claim 1, wherein the cleat portion is adapted to be inserted into and retained by a gap of the vehicle.

16. The cargo retainer of claim 15, wherein the gap is located between a cargo area of the vehicle and either a tailgate of the vehicle or a bumper of the vehicle.

17. The cargo retainer of claim 15, wherein the gap has a width and at least a portion of the cleat portion fills the width of the gap.

18. The cargo retainer of claim 17, further comprising a deformable member adapted to adjust in size to fill the width of the gap.

19. The cargo retainer of claim 18, wherein the deformable member comprises a deformable sleeve disposed on a face of the cleat portion.

20. The cargo retainer of claim 18, wherein the deformable member comprises a foam material.

21. The cargo retainer of claim 18, wherein the deformable member comprises a rubber material.

22. The cargo retainer of claim 18, wherein the deformable member comprises a spring clip disposed on a face of the cleat portion.

23. The cargo retainer of claim 18, wherein the deformable member comprises a flange extending away from a face of the cleat portion.

24. The cargo retainer of claim 17, wherein the cleat portion comprises a first generally vertical member and a second generally vertical member movably coupled with the first generally vertical member, wherein the first generally vertical member and the second generally vertical member are adapted to move relative to each other to fill the width of the gap.

25. The cargo retainer of claim 24, wherein the first generally vertical member and the second generally vertical member are coupled to each other via a hinge.

26. The cargo retainer of claim 24, wherein the first generally vertical member and the second generally vertical member are coupled to each other via a spring.

27. The cargo retainer of claim 24, wherein the first generally vertical member and the second generally vertical member are coupled to each other via a bolt, wherein rotation of the bolt causes the first generally vertical member and the second generally vertical member to move relative to each other.

28. The cargo retainer of claim 1, wherein the cleat portion of the retention anchor has a hook member extending at least partially toward the trailing portion of the mat.

29. The cargo retainer of claim 1, wherein a leading portion length of the mat is approximately equivalent to a trailing portion length of the mat.

30. The cargo retainer of claim 1, wherein a leading portion length of the mat and a trailing portion length of the mat are different such that the mat is trapezoidal.

31. The cargo retainer of claim 1, wherein the trailing portion of the mat is curvilinear.

32. The cargo retainer of claim 1, wherein the mat has edge portions extending between the leading portion and the trailing portion and a plurality of apertures disposed at a plurality of locations on the edge portions, the apertures for selectively securing the mat to the vehicle via the fastener.

33. A cargo retainer for use with a vehicle, comprising:
a mat having a top side, a bottom side, a leading portion, and a trailing portion and an aperture for securing the trailing portion to the vehicle via a fastener;
an interchangeable retention anchor configured to attach to the vehicle, the interchangeable retention anchor having a top portion and a cleat portion, wherein the top portion is removably coupled with a retention plate, the retention plate coupled between the leading portion of the mat, and the cleat portion extends away from the bottom side of the mat.

34. The cargo retainer of claim 33, wherein the interchangeable retention anchor is selectively positionable at a plurality of locations on the retention plate.

35. The cargo retainer of claim 33, wherein the retention anchor has a recess formed in a face of the top portion and the recess is adapted to mate with a corresponding protrusion of the retention plate.

36. The cargo retainer of claim 35, wherein the recess comprises a channel extending longitudinally from a first retention anchor end to a second retention anchor end and having a cross-section, the cross-section being substantially identical to a cross-section of the corresponding protrusion, the corresponding protrusion longitudinally coextensive with the channel.

37. The cargo retainer of claim 36, wherein the retention anchor is slidable along the corresponding protrusion of the retention plate via the channel.

38. The cargo retainer of claim 35, wherein the recess comprises a notch and the corresponding protrusion comprises a pin.

39. The cargo retainer of claim 35, wherein the corresponding protrusion snap fits into the recess.

40. The cargo retainer of claim 39, wherein the recess comprises a substantially annular notch and the corresponding protrusion comprises a substantially annular tip thereby forming an annular snap fit when coupled.

41. The cargo retainer of claim 39, wherein the recess comprises a socket and the corresponding protrusion comprises a ball thereby forming a ball-and-socket snap fit when coupled.

42. The cargo retainer of claim 33, further comprising a moveable jaw structure at least partially forming a recess with the top portion of the retention anchor and selectively mating the recess to a corresponding protrusion of the retention plate.

43. The cargo retainer of claim 42, wherein the moveable jaw structure comprises a screw-type clamp having a screw for coupling the retention anchor to the retention plate.

44. The cargo retainer of claim 42, wherein the moveable jaw structure comprises a hinge for rotatably coupling the retention anchor to the retention plate.

45. The cargo retainer of claim 42, wherein the moveable jaw structure comprises a spring biasing member for coupling the retention anchor to the retention plate.

46. The cargo retainer of claim 33, wherein the cleat portion is adapted to be inserted into and retained by a gap of the vehicle.

47. The cargo retainer of claim 46, wherein the gap is located between a cargo area of the vehicle and either a tailgate of the vehicle or a bumper of the vehicle.

48. The cargo retainer of claim 46, wherein the gap has a width and at least a portion of the cleat portion fills the width of the gap.

49. The cargo retainer of claim 48, further comprising a deformable member adapted to adjust in size to fill the width of the gap.

50. The cargo retainer of claim 49, wherein the deformable member comprises a deformable sleeve disposed on a face of the cleat portion.

51. The cargo retainer of claim 49, wherein the deformable member comprises a foam material.

52. The cargo retainer of claim 49, wherein the deformable member comprises a rubber material.

53. The cargo retainer of claim 49, wherein the deformable member comprises a spring clip disposed on a face of the cleat portion.

54. The cargo retainer of claim 49, wherein the deformable member comprises a flange extending away from a face of the cleat portion.

55. The cargo retainer of claim 48, wherein the cleat portion comprises a first generally vertical member and a second generally vertical member movably coupled with the first generally vertical member, wherein the first generally vertical member and the second generally vertical member are adapted to move relative to each other to fill the width of the gap.

56. The cargo retainer of claim 55, wherein the first generally vertical member and the second generally vertical member are coupled to each other via a hinge.

57. The cargo retainer of claim 55, wherein the first generally vertical member and the second generally vertical member are coupled to each other via a spring.

58. The cargo retainer of claim 55, wherein the first generally vertical member and the second generally vertical member are coupled to each other via a bolt, wherein rotation of the bolt causes the first generally vertical member and the second generally vertical member to move relative to each other.

59. The cargo retainer of claim 33, wherein the cleat portion of the retention anchor has a hook member extending at least partially toward the trailing portion of the mat.

60. The cargo retainer of claim 33, wherein a leading portion length of the mat is approximately equivalent to a trailing portion length of the mat.

61. The cargo retainer of claim 33, wherein a leading portion length of the mat and a trailing portion length of the mat are different such that the mat is trapezoidal.

62. The cargo retainer of claim 33, wherein the trailing portion of the mat is curvilinear.

63. The cargo retainer of claim 33, wherein the mat has edge portions extending between the leading portion and the trailing portion and a plurality of apertures disposed at a plurality of locations on the edge portions, the apertures for selectively securing the mat to the vehicle via the fastener.

64. A cargo retainer for use with a vehicle, comprising:
   a mat having a top side, a bottom side, a leading portion, a trailing portion, edge portions extending between the leading portion and the trailing portion, and a plurality of apertures disposed at a plurality of locations on the edge portions, the apertures for selectively securing the mat to the vehicle via a fastener;
   a plurality of interchangeable retention anchors configured to attach to the vehicle, each interchangeable retention anchor having a top portion and a cleat portion, wherein the top portion is removably coupled with a retention plate and selectively positionable at a plurality of locations on the retention plate, the retention plate coupled between the leading portion of the mat, and each cleat portion extends away from the bottom side of the mat,
   wherein the cleat portion is adapted to be inserted into and retained by a gap formed between a cargo area of the vehicle and either a tailgate of the vehicle or a bumper of the vehicle.

* * * * *